US012011810B2

(12) United States Patent
Shima

(10) Patent No.: US 12,011,810 B2
(45) Date of Patent: Jun. 18, 2024

(54) TECHNIQUE FOR CONTROLLING MOTOR IN ELECTRIC POWER TOOL

(71) Applicant: MAKITA CORPORATION, Anjo (JP)

(72) Inventor: Kunihisa Shima, Anjo (JP)

(73) Assignee: MAKITA CORPORATION, Anjo (JP)

( * ) Notice: Subject to any disclaimer, the term of this patent is extended or adjusted under 35 U.S.C. 154(b) by 113 days.

(21) Appl. No.: 17/960,276

(22) Filed: Oct. 5, 2022

(65) Prior Publication Data

US 2023/0107745 A1 Apr. 6, 2023

(30) Foreign Application Priority Data

Oct. 6, 2021 (JP) ................................ 2021-164979

(51) Int. Cl.
*B25B 23/00* (2006.01)
*B25B 23/147* (2006.01)
*B25B 21/02* (2006.01)

(52) U.S. Cl.
CPC .......... *B25B 23/1475* (2013.01); *B25B 21/02* (2013.01)

(58) Field of Classification Search
CPC .................................................. B25B 23/1475
See application file for complete search history.

(56) References Cited

U.S. PATENT DOCUMENTS

2015/0231770 A1* 8/2015 Kusakawa .......... B25B 23/1475 173/93.5
2017/0057064 A1* 3/2017 Ishikawa ............. B25B 23/1475
2019/0111550 A1* 4/2019 Kato ......................... B25F 5/00

FOREIGN PATENT DOCUMENTS

JP 5591131 B2 9/2014

* cited by examiner

*Primary Examiner* — Eyamindae C Jallow
(74) *Attorney, Agent, or Firm* — Oliff PLC

(57) ABSTRACT

An electric power tool in one aspect of the present disclosure includes a motor, an output shaft, a torque detector, a correction circuit, and an output circuit. The correction circuit corrects a drive command value based on load torque detected by the torque detector. The drive command value indicates a magnitude of electric power to be supplied to the motor. The output circuit outputs a drive signal indicating the drive command value. The drive circuit (i) receives the drive signal from the output circuit and (ii) supplies electric power in accordance with the drive signal to the motor to drive the motor.

17 Claims, 9 Drawing Sheets

TECHNIQUE FOR CONTROLLING MOTOR IN ELECTRIC POWER TOOL

CROSS-REFERENCE TO RELATED APPLICATIONS

This application claims the benefit of priority based on Japanese patent application No. 2021-164979 filed on Oct. 6, 2021 with the Japan Patent Office, and the entire disclosure of Japanese patent application No. 2021-164979 is incorporated herein by reference.

BACKGROUND

The present disclosure relates to an electric power tool.

Japanese Patent No. 5591131 discloses an electric power tool including a microcomputer that controls a motor of the electric power tool. The microcomputer detects a rotational speed of the motor based on a signal (hereinafter, also referred to as "Hall signal") obtained from a Hall sensor in the electric power tool. The microcomputer controls the motor so as to maintain the detected rotational speed at a desired speed.

SUMMARY

The Hall signal varies each time the motor rotates by a given rotation angle. Upon the variation of the Hall signal, the microcomputer calculates a rotational speed based on the variation of the Hall signal.

Thus, during the deceleration of the motor, an actual rotational speed of the motor may be lower than the calculated rotational speed. If the calculated rotational speed is higher than the actual rotational speed, the torque generated by the motor may be insufficient. Especially when the motor rotates at a low speed, an interval of the variation in the Hall signal becomes longer. Therefore, when the motor receives a large load torque during the low speed rotation and the motor is slowed down, the actual rotational speed is lower than the calculated rotational speed for an extended period of time. This may cause the motor to generate an insufficient torque, resulting in a rapid decrease in the actual rotational speed of the motor or a lock of the motor.

In one aspect of the present disclosure, it is preferable to inhibit a decrease in an actual rotational speed of a motor in an electric power tool due to an increase in a load torque applied to the motor.

One aspect of the present disclosure provides an electric power tool including a motor. The electric power tool includes an output shaft. To the output shaft, a tip tool is attached. The output shaft is driven with a rotational force of the motor. The electric power tool includes a torque detector. The torque detector detects a magnitude of a load torque applied to the motor.

The electric power tool includes a correction circuit. The correction circuit corrects a drive command value based on the magnitude of the load torque detected. The drive command value indicates a magnitude of an electric power to be supplied to the motor. The electric power tool includes an output circuit. The output circuit outputs a drive signal. The drive signal indicates the drive command value.

The electric power tool includes a drive circuit. The drive circuit (i) receives the drive signal from the output circuit and (ii) supplies, to the motor, the electric power in accordance with the drive signal to thereby drive the motor. The electric power in accordance with the drive signal has a magnitude corresponding to the drive command value indicated by the drive signal.

In such an electric power tool, the drive command value is corrected based on the load torque. Thus, a drive command value that takes the load torque in consideration, i.e., a drive command value better reflecting (i.e. feedback) an actual rotation state of the motor is generated. This allows to inhibit the decrease in an actual rotational speed of the motor due to the increase in the load torque.

Another aspect of the present disclosure provides a method including:

- detecting a magnitude of a load torque of the motor,
- correcting a drive command value based on the magnitude of the load torque detected, the drive command value indicating a magnitude of an electric power to be supplied to the motor, and
- supplying, to the motor, the electric power having the magnitude in accordance with the drive command value.

This method allows to inhibit the actual rotational speed of the motor from decreasing due to the increase in the load torque.

BRIEF DESCRIPTION OF THE DRAWINGS

Example embodiments of the present disclosure will be described hereinafter by way of example with reference to the accompanying drawings, in which.

DETAILED DESCRIPTION OF EXEMPLARY EMBODIMENTS

Overview of Embodiments

Figure 1:
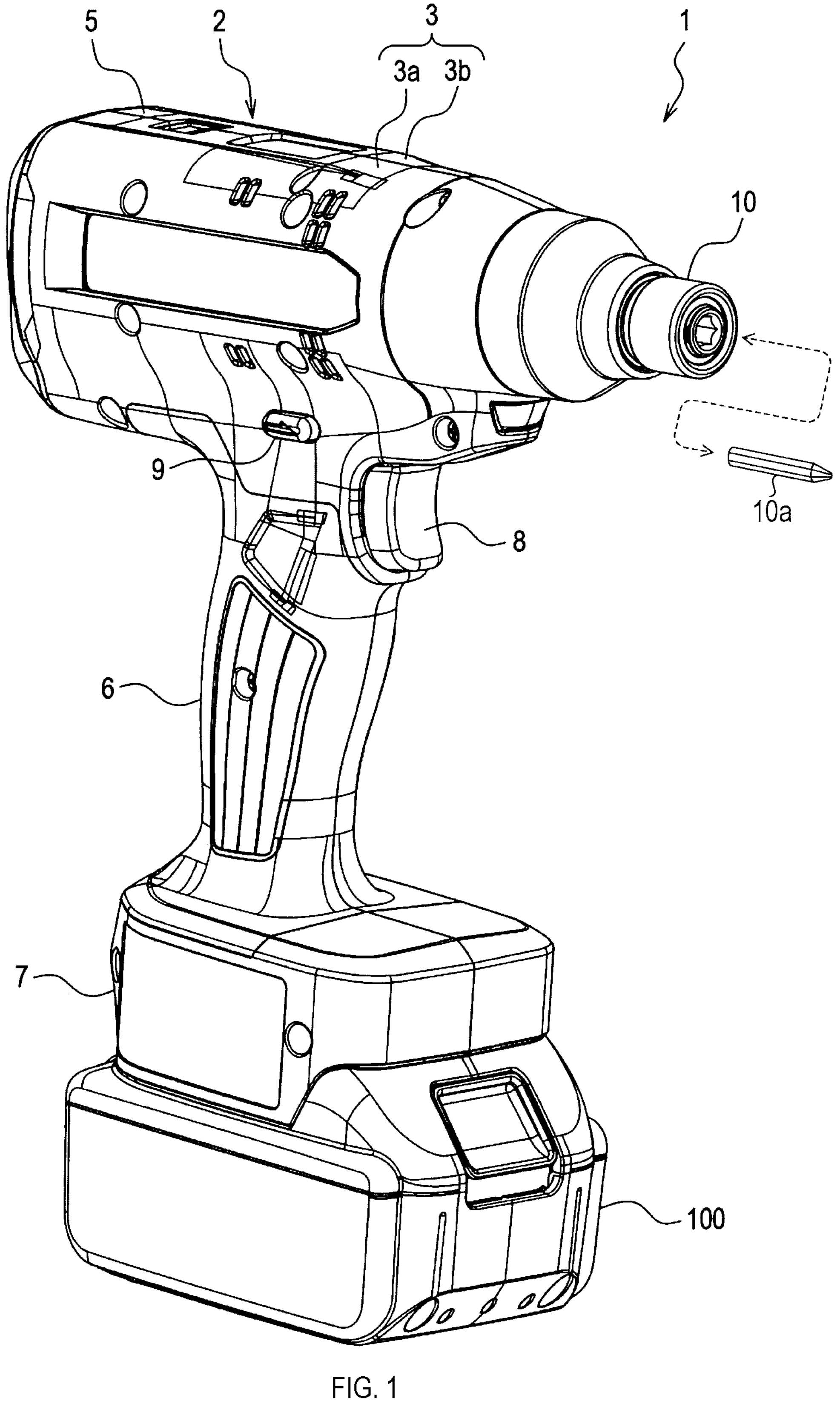
FIG. 1 is a front perspective view of an electric power tool of an embodiment.

One embodiment may provide an electric power tool including at least any one of the following Features 1 through 7:

- Feature 1: a motor;
- Feature 2: an output shaft configured (i) to be attached to a tip tool and (ii) to be driven with a rotational force of the motor;
- Feature 3: a torque detector configured to detect a magnitude of a load torque, the load torque being applied to the motor;
- Feature 4: a correction circuit configured to correct a drive command value based on the load torque detected, the drive command value indicating a magnitude of an electric power to be supplied to the motor;

Feature 5: an output circuit configured to output a drive signal, the drive signal indicating the drive command value;

Feature 6: a drive circuit configured to receive the drive signal from the output circuit;

Feature 7: the drive circuit configured to supply, to the motor, the electric power in accordance with the drive signal to thereby drive the motor, the electric power in accordance with the drive signal having the magnitude corresponding to the drive command value indicated by the drive signal.

In the electric power tool including at least Features 1 through 7, it is possible to inhibit the decrease in the rotational speed of the motor due to the increase in the load torque. Here, the expression of "the decrease in the rotational speed of the motor due to the increase in the load torque" may specifically mean, for example, that a difference between a desired rotational speed and an actual rotational speed increases because of the increase in the load torque. The rotation (and rotational speed) of the motor may mean, for example, the rotation (and rotational speed) of the rotor that will be described below in detail.

The output shaft may be configured so that the tip tool is removably attached thereto. The correction circuit may correct the drive command value in any way based on the load torque. For example, the correction circuit may correct the drive command value so that the drive command value increases in accordance with the increase in the load torque.

The load torque may be torque to be directly or indirectly applied to the motor. That is, the load torque is not limited to torque to be directly applied to the rotor of the motor. When various work is carried out by the tip tool, the tip tool can receive a torque from a work target in a direction interfering with the movement of the tip tool. This torque acts to interfere with the rotation of the output shaft, and thus, acts to interfere with the rotation of the motor. That is, this torque is transmitted to the motor through the output shaft. The torque detector may detect this torque as the load torque. The torque detector may detect a torque at any part of a torque transmission path from the output shaft to the motor.

The electric power tool may include a control circuit. The control circuit may include the torque detector, the correction circuit, and/or the output circuit. The drive circuit may receive the drive signal from the control circuit.

One embodiment may include at least any one of the following Features 8 through 12 in addition to or in place of at least any one of the above Features 1 through 7:

Feature 8: a calculation circuit configured to calculate an initial value of the drive command value;

Feature 9: the correction circuit is configured to correct the initial value based on the magnitude of the load torque detected;

Feature 10: a speed detector configured to detect a rotational speed of the motor;

Feature 11: the calculation circuit is configured to calculate the initial value so that the rotational speed detected corresponds to a desired rotational speed;

Feature 12: the output circuit is configured to output the drive signal, the drive signal indicating the drive command value corresponding to the initial value corrected.

The calculation circuit may calculate the initial value in accordance with the difference between the rotational speed detected by the speed detector and the desired rotational speed. The calculation circuit may calculate the initial value in any way so that the rotational speed detected by the speed detector corresponds to the desired rotational speed (i.e. so that the actual rotational speed corresponds to the desired rotational speed). For example, the calculation circuit may calculate the initial value so that the lower the detected rotational speed is than the desired rotational speed, the more the initial value increases. The control circuit may include the calculation circuit and/or the speed detector.

One embodiment may include at least one of the following Features 13 and 14 in addition to or in place of at least any one of the above Features 1 through 12:

Feature 13: the correction circuit is configured to add a correction value to the initial value to thereby correct the initial value;

Feature 14: the correction value increases in accordance with an increase in the load torque detected.

In the electric power tool including at least Features 1 through 9, 13, and 14, it is possible to inhibit the decrease in the rotational speed of the motor due to the increase in the load torque.

One embodiment may include at least any one of the following Features 15 through 19 in addition to or in place of at least any one of the above Features 1 through 14:

Feature 15: the drive circuit includes a switch on a power supply path, the power supply path is configured to connect the motor to a power supply;

Feature 16: the drive command value includes a duty ratio;

Feature 17: the correction circuit is configured to correct the duty ratio based on the load torque detected;

Feature 18: the output circuit is configured to output the drive signal, the drive signal is in the form of a pulse width modulated signal having the duty ratio;

Feature 19: the drive circuit is configured to periodically turn on and off the switch in accordance with the drive signal to thereby periodically complete and interrupt the power supply path.

In the electric power tool including the at least Features 1 through 7, 10, 11, and 15 through 19, the electric power tool can efficiently perform a constant rotation control. The constant rotation control includes controlling the motor so that the actual rotational speed of the motor corresponds to the desired rotational speed. Furthermore, the electric power tool can easily calculate an appropriate drive command value (i.e., duty ratio) that takes the load torque in consideration.

One embodiment may include the above Feature 15 and at least any one of the following Features 20 through 26 in addition to or in place of at least any one of the above Features 1 through 14 and 16 through 19:

Feature 20: the initial value includes a first duty ratio;

Feature 21: the correction value includes a second duty ratio, the second duty ratio being increased in accordance with an increase in the load torque;

Feature 22: the correction circuit is configured to add the second duty ratio to the first duty ratio to thereby correct the first duty ratio;

Feature 23: the output circuit is configured to output the drive signal, the drive signal being in the form of the pulse width modulated signal, the pulse width modulated signal having the first duty ratio corrected;

Feature 24: the drive circuit is configured to periodically turn on and off the switch in accordance with the drive signal to thereby periodically complete and interrupt the power supply path.

One embodiment may include at least any one of the following Features 25 and 26 in addition to or in place of at least any one of the above Features 1 through 24:

Feature 25: the correction circuit is configured to correct the drive command value based on the drive command value being required to be corrected;

Feature 26: the output circuit is configured to output the drive signal based on the drive command value not being required to be corrected, the drive signal indicating the drive command value not corrected.

In the electric power tool including at least Features 1 through 7, 25, and 26, it is possible to effectively utilize the resource of the electric power tool. If this electric power tool further includes the Features 8 and 9, the output circuit may output a drive signal indicating the initial value in response to the correction requirement not being satisfied.

One embodiment may include the following Feature 27 in addition to or in place of at least any one of the above-described Features 1 through 26:

Feature 27: the correction circuit is configured to correct the drive command value based on the desired rotational speed being equal to or less than a preset threshold.

In the electric power tool including at least Features 1 through 7 and 25 through 27, it is possible to inhibit the decrease in the rotational speed due to the load torque in a low speed range where the rotational speed is easily decreased because of the load torque.

One embodiment may include at least any one of the following Features 28 through 30 in addition to or in place of at least any one of the above Features 1 through 27:

Feature 28: the motor includes a rotor;

Feature 29: a rotation signal output circuit configured to output a rotation signal, the rotation signal being varied each time the rotor rotates by a given angle;

Feature 30: the speed detector is configured (i) to receive the rotation signal and (ii) to detect the rotational speed based on the rotation signal.

In the electric power tool including at least Features 1 through 11 and 28 through 30, even if the load torque increases during an update waiting period (or variance waiting period) for updating (or varying) the rotational speed detected by the speed detector, the correction process allows to inhibit the decrease in the rotational speed due to the increase in the load torque. The update waiting period corresponds to a period of time from a first timing to a second timing. The first timing corresponds to a timing when the rotational speed detected by the speed detector is updated (or varied). In other words, the first timing corresponds to a timing when the rotation signal is varied. The second timing corresponds to a timing when the rotational speed detected by the speed detector is updated again after the first timing. In other words, the second timing corresponds to a timing when the rotation signal is varied again after the first timing. In other words, the update waiting period corresponds to a period of time when the rotor rotates by the given angle.

One embodiment may include at least one of the following Features 31 and 32 in addition to or in place of at least any one of the above Features 1 through 30:

Feature 31: the correction circuit is configured to repeatedly (or periodically) correct the drive command value in a preset cycle;

Feature 32: the preset cycle is shorter than a period of time required for the rotor to rotate by the given angle at a specified rotational speed or less.

In the electric power tool including at least Features 1 through 11, 28 through 32, it is possible to efficiently inhibit the decrease in the rotational speed of the motor due to the increase in the load torque. In the low speed range, the rotational speed is easily decreased because of the increase in the load torque.

The torque detector may detect the magnitude of the load torque continuously (i.e. in real time) or discretely. When the magnitude of the load torque is discretely detected, the detection interval of the load torque may be shorter than the preset cycle.

One embodiment may include the above Features 28 through 30 and at least one of the following Features 33 and 34 in addition to or in place of at least any one of the above Features 1 through 27, 31, and 32:

Feature 33: the correction circuit is configured to repeatedly correct the drive command value in a preset cycle while the desired rotational speed is equal to or less than a preset threshold;

Feature 34: the preset cycle is shorter than a period of time required for the rotor to rotate by the given angle at the preset threshold or less.

In the electric power tool including at least Features 1 through 11, 28 through 30, 33, and 34, it is possible to efficiently inhibit the decrease in the rotational speeded due to the increase in the load torque in a speed range lower than the preset threshold.

One embodiment may include the following Feature 35 in addition to or in place of at least any one of the above-described Features 1 through 34:

Feature 35: the rotation signal output circuit includes a Hall sensor.

One embodiment may include the following Features 36 through 38 in addition to or in place of at least any one of the above-described Features 1 through 35:

Feature 36: a gear box configured to transmit the rotational force of the motor to the output shaft;

Feature 37: a torque sensor in the gear box or the output shaft, the torque sensor being configured to output a torque signal, the torque signal indicating the magnitude of the load torque;

Feature 38: the torque detector is configured (i) to receive the torque signal and (ii) to detect the magnitude of the load torque based on the torque signal.

In the electric power tool including at least Features 1 through 7, 36, and 37, an actual load torque is detected directly (or almost directly). Thus, the correction circuit can correct the drive command value with high accuracy in accordance with the actual load torque.

The torque sensor may output the torque signal in accordance with mechanical torsion occurred in the gear box or the output shaft because of the load torque.

One embodiment may include at least one of the following Features 39 and 40 in addition to or in place of at least any one of the above Features 1 through 38:

Feature 39: a current detection circuit configured to detect a magnitude of a current flowing through the motor;

Feature 40: the torque detector is configured to detect the magnitude of the load torque based on the magnitude of the current detected.

In the electric power tool including at least Features 1 through 7, 39, and 40, the magnitude of the load torque can be detected without using the torque sensor.

One embodiment may include at least any one of the following Features 41 through 43 in addition to or in place of at least any one of the above Features 1 through 40:

Feature 41: a power supply path continued to electrically connect the drive circuit to a power supply, the power supply being configured to supply, to the motor, the electric power through the power supply path and the drive circuit;

Feature 42: a voltage detection circuit configured to detect a magnitude of a voltage at the power supply path;

Feature 43: a torque detector is configured to detect the magnitude of the load torque based on a difference between a first voltage and a second voltage, wherein the first voltage corresponds to the voltage at the power supply path detected while the electric power is not supplied to the motor, and wherein the second voltage corresponds to the voltage at the power supply path detected while the electric power is supplied to the motor.

In the electric power tool including at least Features 1 through 7 and 41 through 43, the load torque can be detected without using the torque sensor and/or the current detection circuit.

In one embodiment, the controlling circuit may be integrated into a single electronic unit, a single electronic device, or a single circuit board.

In one embodiment, the controlling circuit may be a combination of two or more electronic circuits, a combination of two or more electronic units, or a combination of two or more electronic devices, each of which is individually arranged on the electric power tool or inside the electric power tool.

In one embodiment, the controlling circuit may include a microcomputer.

In one embodiment, the controlling circuit may include a combination of electronic components, such as discrete elements, in place of or in addition to the microcomputer, or may include an application specific integrated circuit (ASIC), an application specific standard produce (ASSP), a programmable logic device such as a field programmable gate array (FPGA), or any combination thereof.

Examples of the motor include a brushed DC motor, a brushless DC motor, and an AC motor.

Examples of the drive circuit include a bridge circuit and a full bridge circuit.

In one embodiment, the speed detector and/or the torque detector may be included in the control circuit.

One embodiment may provide a method including the following Features 44 and/or 45:

Feature 44: detecting a magnitude of a load torque of the motor;

Feature 45: correcting a drive command value based on the magnitude of the load torque detected, the drive command value indicating a magnitude of an electric power to be supplied to the motor;

Feature 46: supplying, to the motor, the electric power having the magnitude in accordance with the drive command value.

The method including at least Features 44 through 46 makes it possible to inhibit the decrease in the rotational speed of the motor due to the increase in the load torque.

In one embodiment, the above-described Features may be combined in any way. In one embodiment, any of the above-described Features may be omitted.

2. Specific Example Embodiment

A description will be given below of a specific example embodiment. This specific example embodiment is merely an example, and the present disclosure is not limited to this embodiment and may be implemented in any form.

(2-1) Configuration of Electric Power Tool

Figure 2:
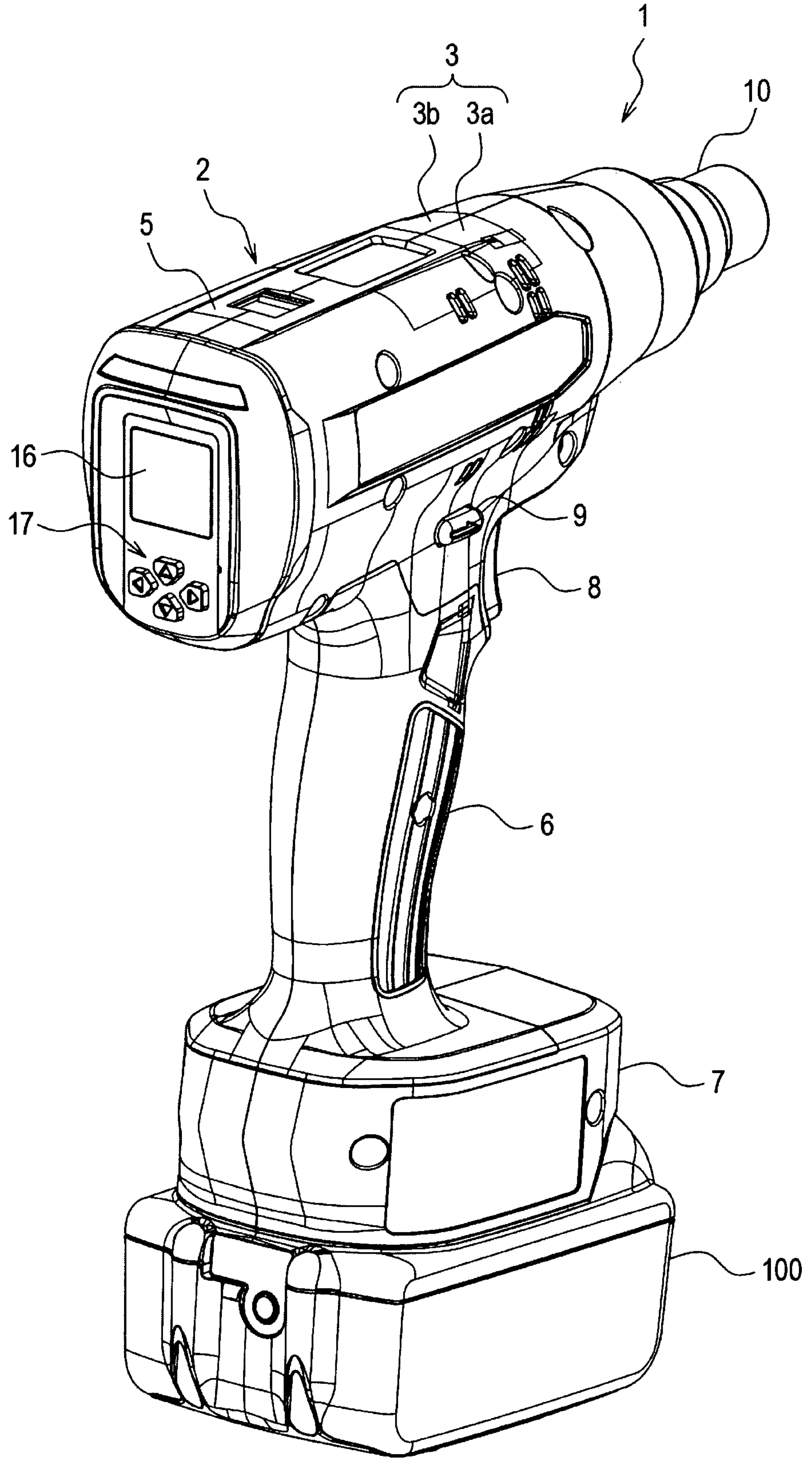
FIG. 2 is a rear perspective view of the electric power tool of the embodiment.
Figure 3:
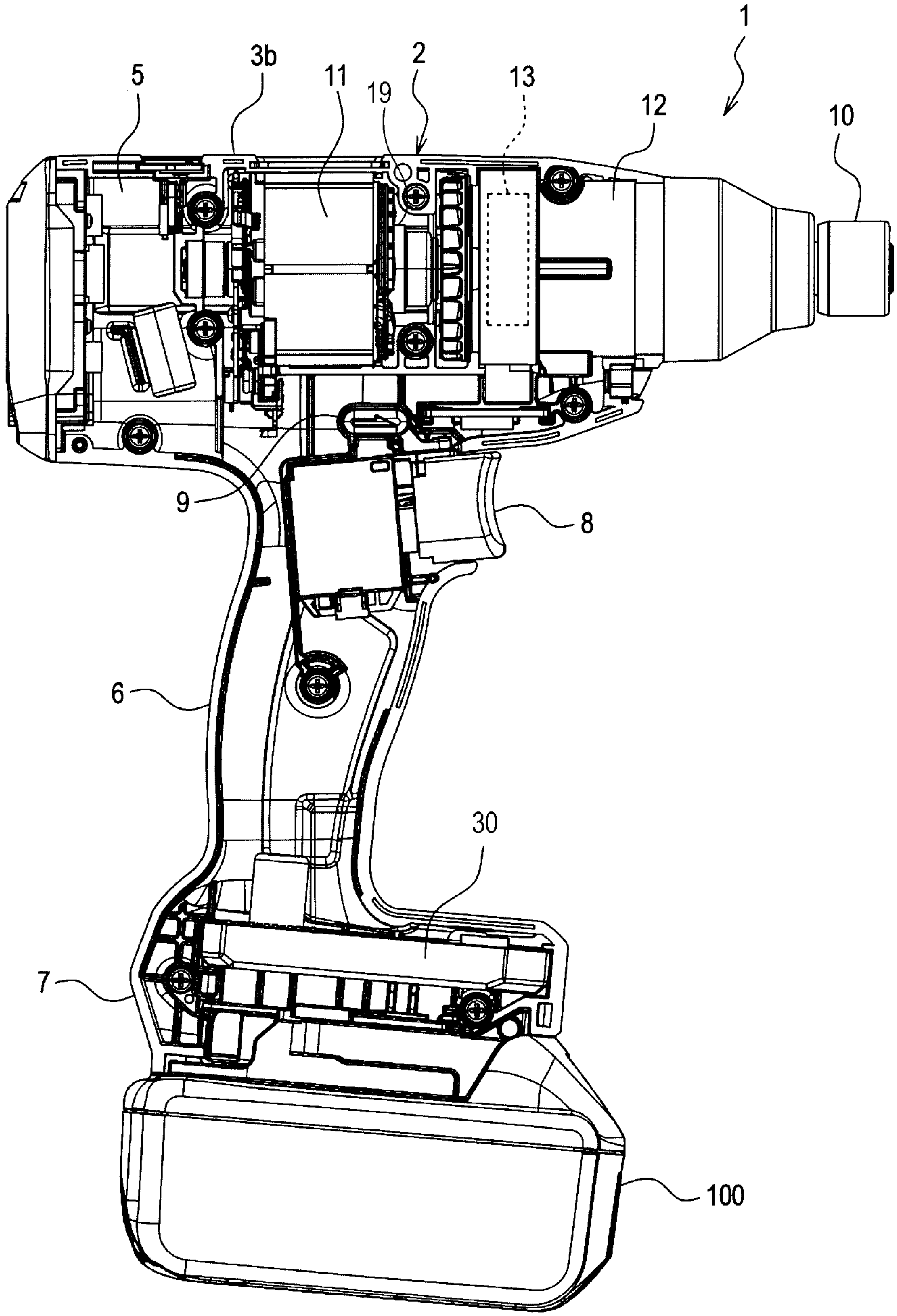
FIG. 3 is a side view of the electric power tool having a first half housing removed.

As shown in FIGS. 1 through 3, the present embodiment provides an electric power tool 1 in the form of a battery powered screwdriver (or a cordless screwdriver). The electric power tool 1 rotationally drives a fastening member, such as a screw. The electric power tool 1 of the present embodiment is driven by electric power (hereinafter, also referred to as "battery power") of a battery 101 described below (see FIG. 4). In other embodiments, that electric power tool 1 may be an electric power tool in any other forms including an impact driver.

As shown in FIG. 1 and FIG. 2, the electric power tool 1 includes a main body 2. The main body 2 includes a housing 3. The housing 3 is divided into left and right. Specifically, the housing 3 includes a first half housing **3*a* and a second half housing 3*b*. The first half housing 3*a* and the second half housing 3*b* are combined to form the housing 3**.

The main body 2 includes a first casing 5. The first casing 5 contains a motor 11 (see FIG. 3) and a driving mechanism 12 (see FIG. 3). The first casing 5 further includes a direction setting switch 9 and a chuck sleeve 10.

The chuck sleeve 10 is selectively and removably attached to various tip tools (or tools). Each of the various tip tools may have any function. The various tip tools may include, for example, a Phillips-head driver bit **10*a* shown in FIG. 1. After attached to the chuck sleeve 10, the tip tool is driven (e.g. rotated) by a rotational force of the motor 11**.

The motor 11 is, in the present embodiment, in the form of a brushless motor (or a brushless DC motor). In other embodiments, the motor 11 may be a motor in any other forms including a brushed DC motor and an AC motor. The rotational driving force (or rotational force) generated by the motor 11 is transmitted to the driving mechanism 12. As shown in FIG. 3, the motor 11 includes a rotor 19. The rotor 19 of the present embodiment is in the form of a permanent magnet typed rotor. The rotation of the motor 11 specifically means a rotation of the rotor 19. The driving mechanism 12 includes, for example, a deceleration mechanism (not shown). The deceleration mechanism transmits the rotational driving force of the motor 11 to the chuck sleeve 10. The deceleration mechanism reduces the rotational speed of the chuck sleeve 10 so as to be lower than the rotational speed of the motor 11.

The direction setting switch 9 sets (or specifies) a rotation direction of the motor 11 (i.e. a rotation direction of the chuck sleeve 10). A user of the electric power tool 1 may operate the direction setting switch 9 to alternatively select a first direction (e.g. a forward rotation or a clock wise (CW) rotation) or a second direction (e.g. reverse rotation or a counter-clock wise (CCW) rotation). The direction setting switch 9 outputs a direction setting signal. The direction setting signal shows a rotation direction selected by the direction setting switch 9.

The direction setting switch 9 may be moved to a first position or a second position by user's hand (or by manual operation), for example. In response to the direction setting switch 9 being moved to the first position, the rotation direction of the motor 11 may be set to the first direction. In response to the direction setting switch 9 being moved to the second position, the rotation direction of the motor 11 may be set to the second direction. The respective rotation directions of the motor 11 corresponding to the first position and the second position may be fixed beforehand. In each of the first position and the second position, certain operating conditions may be set. The operating condition may at least include, for example, the rotation direction of the motor 11. The operating condition may further include a desired rotational speed (or a target rotational speed) of the motor 11

(i.e. a desired rotational speed of the chuck sleeve 10) and/or a stop requirement of the motor 11. The motor 11 may be driven in accordance with the operating condition corresponding to the position of the direction setting switch 9.

The main body 2 includes a grip 6. The grip 6 extends from the first casing 5. The grip 6 is gripped by the user, for example. The grip 6 has a trigger switch 8 provided thereto. The user can manually move (e.g. pull) the trigger switch 8 while holding the grip 6. In this embodiment, pulling the trigger switch 8 corresponds to (i) move the trigger switch 8 in a left direction in FIG. 3 or (ii) push the trigger switch 8 into the main body 2.

The trigger switch 8 is manually turned on. The trigger switch 8 is turned off while not manually operated. The trigger switch 8 outputs a trigger detection signal. The trigger detection signal indicates whether the trigger switch 8 is turned off. The trigger detection signal may further indicate a position (or a length of movement, or a distance of movement, or an operation amount) of the trigger switch 8.

The main body 2 includes a second casing 7. The second casing 7 extends from the grip 6. The bottom of the second casing 7 is removably attached to a battery pack 100. As shown in FIG. 3, the second casing 7 contains a controller 30.

As shown in FIG. 3, the first casing 5 includes a torque sensor 13. The torque sensor 13 detects a load torque of the motor 11. The load torque is directly or indirectly applied to the motor 11. When the tip tool attached to the chuck sleeve 10 does various works (e.g. drilling), the motor 11 receives the load torque from a work target (or workpiece). The motor 11 receives the load torque from the work target through the tip tool, the chuck sleeve 10 and the driving mechanism 12. The torque sensor 13 outputs a signal (hereinafter, also referred to as "torque detection signal") in accordance with the load torque. In this embodiment, detecting the load torque includes detecting a magnitude of the load torque. In this embodiment, the torque detecting signal indicates the magnitude of the load torque.

The torque sensor 13 may be arranged at any position where the load torque is detectable. The torque sensor 13 may be provided, for example, to the chuck sleeve 10 or the driving mechanism 12. In this embodiment, the torque sensor 13 is provided, for example, to the driving mechanism 12. The torque sensor 13 may generate the torque detection signal in any manner (e.g. based on any principle). The torque detection signal may be in any form. The torque sensor 13 of this embodiment generates, for example, an analog voltage corresponding to an amount of mechanical torsion of a shaft (not shown). The torque detection signal includes this analog voltage. The shaft transmits a rotation of the motor 11 to the chuck sleeve 10.

The torque sensor 13 of this embodiment outputs the torque detection signal corresponding to the actual load torque (i.e. corresponding to the actual amount of torsion of the shaft) in real time (i.e. continuously). Thus, the torque detection signal output from the torque sensor 13 at a certain point in time indicates the actual load torque at the point in time (or at an approximate point in time).

(2-2) Electrical Configuration of Electric Power Tool

Figure 4:
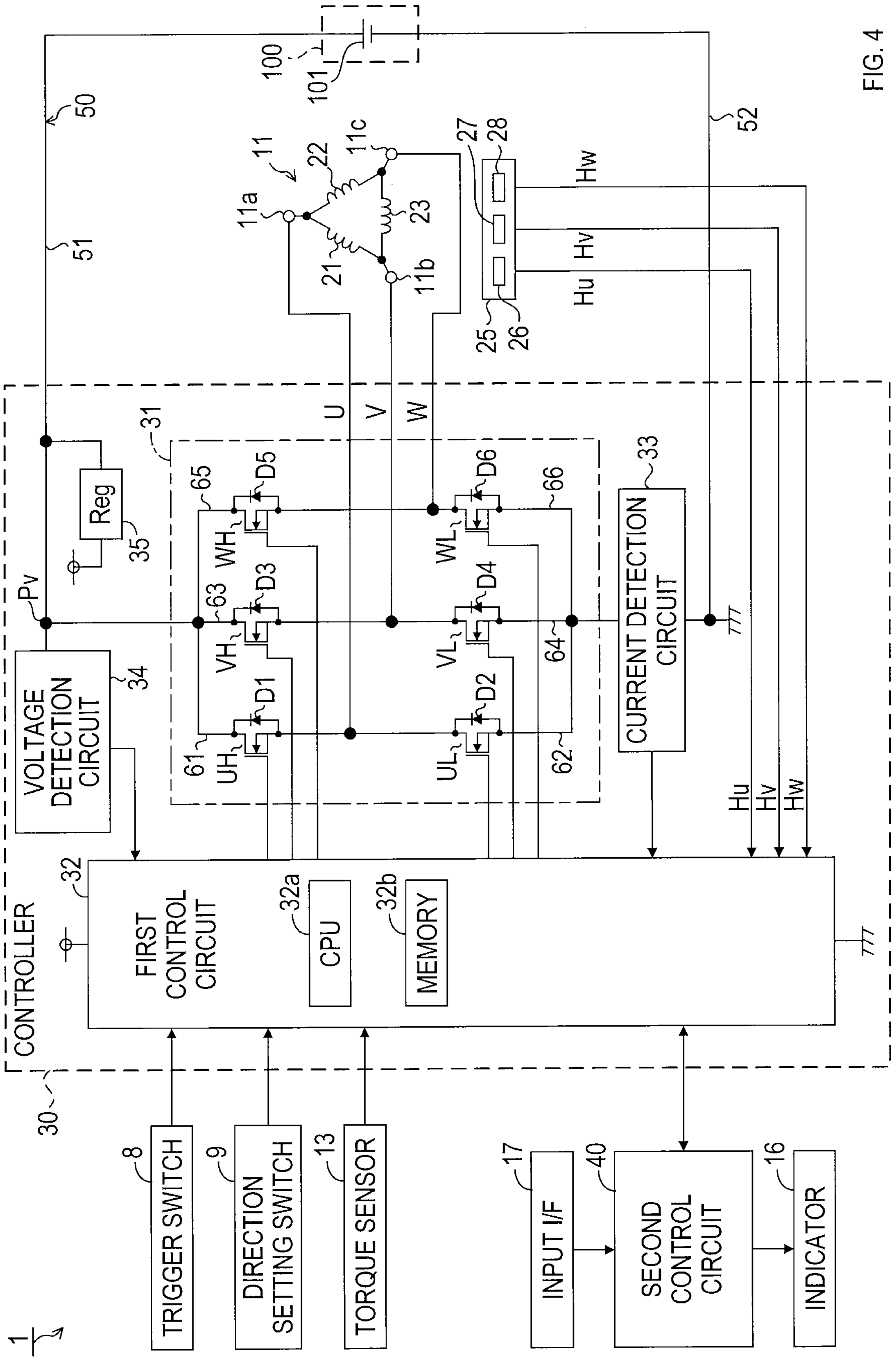
FIG. 4 is an explanatory diagram showing an electrical configuration of the electric power tool of the embodiment.

The electrical configuration of the electric power tool 1 will be described in a supplemental manner with reference to FIG. 4. FIG. 4 shows the electric power tool 1 with the battery pack 100 attached to the main body 2.

The battery pack 100 includes the battery 101. The battery 101 may be a rechargeable battery, for example. The battery 101 may be a lithium ion battery, for example. The battery 101 may be a rechargeable battery different from the lithium ion battery.

The electric power tool 1 includes the motor 11, the trigger switch 8, the direction setting switch 9 and the torque sensor 13. The electric power tool 1 further includes a display 16 and an input I/F 17. Here, the term "I/F" is an abbreviation of an interface.

The motor 11 is driven by the battery power. The motor 11 receives the battery power from the battery 101 through a below-described drive circuit 31. The drive circuit 31 converts the battery power into three-phase power. The motor 11 receives the three-phase power.

The motor 11 includes a first winding 21, a second winding 22, and a third winding 23. In this embodiment, the first through third windings 21-23 are connected, for example, in a delta connection. However, the first through third windings 21-23 may be connected in a manner other than the delta connection. The motor 11 comprises a first terminal 11*a*, a second terminal 11*b*, and a third terminal 11*c*. The first through third terminals 11*a*-11*c* receive the three-phase power. The three-phase power is delivered from the first through third terminals 11*a*-11*c* to the first through third windings 21-23.

Furthermore, the electric power tool 1 includes a rotation signal output circuit (or a rotational-position detector) 25. The rotation signal output circuit 25 outputs rotational position information. The rotational position information may indicate whether the motor 11 is rotating. The rotational position information may be varied in accordance with a rotational position and/or a rotational speed of the motor 11. The rotational position information may indicate a rotational position of the motor 11, more specifically, a rotational position of the rotor 19. The rotational position information of this embodiment includes a first position signal Hu, a second position signal Hv, and a third position signal Hw. The rotational position information is input into a below-described first control circuit 32.

The rotation signal output circuit 25 of this embodiment includes three Hall sensors. That is, the rotation signal output circuit 25 includes a first Hall sensor 26, a second Hall sensor 27, and a third Hall sensor 28. The first through third Hall sensors 26-28 are arranged around the rotor 19. Specifically, the first through third Hall sensors 26-28 are arranged along a rotation direction of the rotor 19, spaced from each other at an angle corresponding to an electrical angle of 120 degrees.

The first Hall sensor 26 has a first Hall element (not shown) and outputs the first position signal Hu. The first position signal Hu is varied in accordance with a position of the first Hall sensor 26 (specifically, the first Hall element) relative to the rotor 19. The second Hall sensor 27 has a second Hall element (not shown) and outputs the second position signal Hv. The second position signal Hv is varied in accordance with a position of the second Hall sensor 27 (specifically, the second Hall element) relative to the rotor 19. The third Hall sensor 28 has a third Hall element (not shown) and outputs the third position signal Hw. The third position signal Hw is varied in accordance with a position of the third Hall sensor 28 (specifically, the third Hall element) relative to the rotor 19.

Each of the first through third position signals Hu, Hv, Hw is in the form of a binary signal (i.e. digital signal) in this embodiment. That is, the first through third position signals Hu, Hv, Hw are each set to a high level or a low level. The respective levels of the first through third position signals Hu, Hv, Hw are varied each time the rotor 19 rotates by an angle corresponding to an electrical angle of 180 degrees. The first through third position signals Hu, Hv, Hw have a phase difference of 120 degrees from each other. Thus, in this embodiment, the level of one of the first through third position signals Hu, Hv, Hw is varied each time the rotor 19 rotates by an angle corresponding to an electrical angle of 60 degrees.

The electric power tool 1 further includes a controller 30. The controller 30 is electrically connected to the battery pack 100 attached to the main body 2 through a power supply path 50. The controller 30 receives the battery power from the battery 101 through the power supply path 50. The power supply path 50 includes a positive electrode path 51 and a negative electrode path 52. The controller 30 includes the drive circuit 31. The positive electrode path 51 leads from a positive electrode of the battery 101 to the drive circuit 31. The negative electrode path 52 leads from a negative electrode of the battery 101 to the drive circuit 31. The power supply path 50 further includes a below-described first path 61, a second path 62, a third path 63, a fourth path 64, a fifth path 65, and a sixth path 66. The first through sixth paths 61-66 are provided to the drive circuit 31.

The drive circuit 31 is connected to the first through third terminals 11*a*-11*c*. The drive circuit 31 receives the battery power from the battery 101. The drive circuit 31 generates the above-mentioned three-phase power from the battery power and supplies it to the motor 11. The motor 11 is driven by the three-phase power.

The drive circuit 31 of this embodiment is in the form of a 3-phase full-bridge circuit. That is, the drive circuit 31 includes a first switch UH, a second switch UL, a third switch VH, a fourth switch VL, a fifth switch WH, and a sixth switch WL. Each of the first through sixth switches UH, UL, VH, VL, WH, WL may be in any form. In this embodiment, each of the first through sixth switches UH, UL, VH, VL, WH, WL is in the form of, for example, N-Channel metal oxide semiconductor field effect transistor (MOSFET).

The drive circuit 31 includes the above-mentioned first through sixth paths 61-66. The first path 61 electrically connects the first terminal 11*a* to the positive electrode path 51 (i.e. to the positive electrode of the battery 101). A path from the first terminal 11*a* to the positive electrode of the battery 101 may be considered as the first path 61. The second path 62 electrically connects the first terminal 11*a* to the negative electrode path 52 (i.e. to the negative electrode of the battery 101). A path from the first terminal 11*a* to the negative electrode of the battery 101 may be considered as the second path 62. The third path 63 electrically connects the second terminal 11*b* to the positive electrode path 51 (i.e. to the positive electrode of the battery 101). A path from the second terminal 11*b* to the positive electrode of the battery 101 may be considered as the third path 63. The fourth path 64 electrically connects the second terminal 11*b* to the negative electrode path 52 (i.e. to the negative electrode of the battery 101). A path from the second terminal 11*b* to the negative electrode of the battery 101 may be considered as the fourth path 64. The fifth path 65 electrically connects the third terminal 11*c* to the positive electrode path 51 (i.e. to the positive electrode of the battery 101). A path from the third terminal 11*c* to the positive electrode of the battery 101 may be considered as the fifth path 65. The sixth path 66 electrically connects the third terminal 11*c* to the negative electrode path 52 (i.e. to the negative electrode of the battery 101). A path from the third terminal 11*c* to the negative electrode of the battery 101 may be considered as the sixth path 66.

The first switch UH is on the first path 61. The first switch UH is turned on when receiving a first drive signal from the first control circuit 32. The first switch UH is turned off in response to not receiving the first drive signal. The first path 61 completes through the first switch UH in response to the first switch UH being turned on. The first path 61 is interrupted by the first switch UH in response to the first switch UH being turned off. The first switch UH includes a first diode D1. Alternatively, to the first switch UH, the first diode D1 is connected. The first diode D1 includes an anode connected to a source of the first switch UH and a cathode connected to a drain of the first switch UH.

The second switch UL is on the second path 62. The second switch UL is turned on in response to receiving a second drive signal from the first control circuit 32. The second switch UL is turned off in response to not receiving the second drive signal. The second path 62 completes through the second switch UL in response to the second switch UL being turned on. The second path 62 is interrupted by the second switch UL in response to the second switch UL being turned off. The second switch UL includes a second diode D2. Alternatively, to the second switch UL, the second diode D2 is connected. The second diode D2 includes an anode connected to a source of the second switch UL and a cathode connected to a drain of the second switch UL.

The third switch VH is on the third path 63. The third switch VH is turned on in response to receiving a third drive signal from the first control circuit 32. The third switch VH is turned off in response to not receiving the third drive signal. The third path 63 completes through the third switch VH in response to the third switch VH being turned on. The third path 63 is interrupted by the third switch VH in response to the third switch VH being turned off. The third switch VH includes a third diode D3. Alternatively, to the third switch VH, the third diode D3 is connected. The third diode D3 includes an anode connected to a source of the third switch VH and a cathode connected to a drain of the third switch VH.

The fourth switch VL is on the fourth path 64. The fourth switch VL is turned on in response to receiving a fourth drive signal from the first control circuit 32. The fourth switch VL is turned off in response to not receiving the fourth drive signal. The fourth path 64 completes through the fourth switch VL in response to the fourth switch VL being turned on. The fourth path 64 is interrupted by the fourth switch VL in response to the fourth switch VL is turned off. The fourth switch VL includes a fourth diode D4. Alternatively, to the fourth switch VL, the fourth diode D4 is connected. The fourth diode D4 includes an anode connected to a source of the fourth switch VL and a cathode connected to a drain of the fourth switch VL.

The fifth switch WH is on the fifth path 65. The fifth switch WH is turned on in response to receiving a fifth drive signal from the first control circuit 32. The fifth switch WH is turned off in response to not receiving the fifth drive signal. The fifth path 65 completes through the fifth switch WH in response to the fifth switch WH being turned on. The fifth path 65 is interrupted by the fifth switch WH in response to the fifth switch WH being turned off. The fifth switch WH includes a fifth diode D5. Alternatively, to the fifth switch WH, the fifth diode D5 is connected. The fifth diode D5 includes an anode connected to a source of the fifth switch WH and a cathode connected to a drain of the fifth switch WH.

The sixth switch WL is on the sixth path 66. The sixth switch WL is turned on in response to receiving a sixth drive signal from the first control circuit 32. The sixth switch WL is turned off in response to not receiving the sixth drive signal. The sixth path 66 completes through the sixth switch WL in response to the sixth switch WL being turned on. The sixth path 66 is interrupted by the sixth switch WL in response to the sixth switch WL being turned off. The sixth switch WL includes a sixth diode D6. Alternatively, to the sixth switch WL, the sixth diode D6 is connected. The sixth diode D6 includes an anode connected to a source of the sixth switch WL and a cathode connected to a drain of the sixth switch WL.

The drive circuit 31 can be divided, for example, into three systems. The three systems include, for example, a U-PHASE system, a V-PHASE system and a W-PHASE system. The U-PHASE system includes the first and second switches UH, UL and the first and second paths 61, 62. The V-PHASE system includes the third and fourth switches VH, VL and the third and fourth paths 63, 64. The W-PHASE system includes the fifth and sixth switches WH, WL and the fifth and sixth paths 65, 66. The drive circuit 31 may be any form of bridge circuit other than the 3-phase full-bridge circuit.

The controller 30 includes a current detection circuit (or a current detector) 33. The current detection circuit 33 detects a current value (hereinafter, also referred to as "motor current value") flowing from the battery 101 to the motor 11. The current detection circuit 33 of this embodiment is provided, for example, to the negative electrode path 52. In response to the electric power being supplied from the battery 101 to the motor 11, the current flows through the negative electrode path 52. The motor current value corresponds to a current value flowing through the negative electrode path 52. The current detection circuit 33 outputs a signal (hereinafter, also referred to as "current detection signal") corresponding to a magnitude of the current flowing through the negative electrode path 52. The current detection signal indicates a current value (i.e. the motor current value) flowing through the negative electrode path 52. The current detection signal of this embodiment has a voltage having a value corresponding to the motor current value. The current detection signal is input into the first control circuit 32.

The controller 30 includes a voltage detection circuit (a voltage detector) 34. The voltage detection circuit 34 is provided to detect a voltage value of a voltage detection point Pv. The voltage detection point Pv corresponds to a specified position in the power supply path 50. In this embodiment, the voltage detection point Pv exists, for example, within the controller 30. The voltage detection point Pv may be near the drive circuit 31 in the positive electrode path 51. The voltage detection circuit 34 outputs a signal (hereinafter, also referred to as "voltage detection signal") corresponding to a magnitude of the voltage at the voltage detection point Pv. The voltage detection signal indicates a voltage value at the voltage detection point Pv. The voltage detection signal is input into the first control circuit 32.

The controller 30 includes the first control circuit 32. The first control circuit 32 of this embodiment is in the form of a microcomputer or a micro control unit (MCU) including a CPU 32*a* and a memory 32*b*. The memory 32*b* may include, for example, a semiconductor memory such as a ROM, a RAM, an NVRAM, and a flash memory.

The first control circuit 32 realizes various functions by executing a program stored in a non-transitory tangible storage medium. In this embodiment, a memory 32*b* corresponds to the non-transitory tangible storage medium storing the program. In this embodiment, the memory 32*b* stores programs of a below-described motor control process (see FIG. 8) and a duty ratio calculation process (see FIG. 9).

A part or all of the various functions implemented by the first control circuit 32 may be accomplished by program execution (i.e. by software process) and may be accomplished by one or more hardware. For example, in place of or in addition to the microcomputer, the first control circuit 32 may be provided with a logic circuit including multiple electronic components. The first control circuit 32 may include, for example, Application Specific Integrated Circuit (ASIC) and/or Application Specific Standard Product (ASSP). The first control circuit 32 may include a programmable logic device that can build an arbitrary logic circuit, e.g. a field programmable gate array (FPGA). Alternatively, the first control circuit 32 may be in the form of a hard wired circuit.

The first control circuit 32 receives the rotational position information (i.e., the first through third position signals Hu, Hv, Hw) from the rotation signal output circuit 25. The first control circuit 32 detects a rotational speed of the motor 11 each time a level of any one of the first through third position signals Hu, Hv, Hw is varied (i.e. each time the rotor 19 rotates by an angle corresponding to 60 electrical degrees). Specifically, the first control circuit 32 detects the rotational speed based on a period of time from a timing when a level was varied in the past (e.g. at the last time) to a timing when a level is varied at this time.

More specifically, in this embodiment, each time a level of any one of the first through third position signals Hu, Hv, Hw is varied, a process of the CPU 32*a* is interrupted (hereinafter, also referred to as "Hall sensor interruption"). Upon receipt of the Hall sensor interruption, the CPU 32*a* calculates the rotational speed of the motor 11. Until a next Hall sensor interruption enters again, the CPU 32*a* recognizes the calculated rotational speed as a current rotational speed (hereinafter, also referred to as "actual rotational speed") of the motor 11. Hereinafter, a term of "recognized rotational speed" means a rotational speed calculated upon receipt of the Hall sensor interruption. That is, in this embodiment, the recognized rotational speed is updated each time the CPU 32*a* receives the Hall sensor interruption (i.e. each time the rotor 19 rotates by the angle corresponding to 60 electrical degrees). After the recognized rotational speed is calculated, the recognized rotational speed is not changed (or updated) until a next recognized rotational speed is calculated again even if the actual rotational speed is varied.

The first control circuit 32 receives the trigger detection signal from a trigger switch 8. The first control circuit 32 can detect, based on the trigger detection signal, whether the trigger switch 8 is turned.

The first control circuit 32 receives a direction setting signal from the direction setting switch 9. The first control circuit 32 can detect which direction is selected, the first direction or the second direction, based on the direction setting signal.

The first control circuit 32 receives the torque detection signal from a torque sensor 13. The first control circuit 32 can detect the load torque based on the torque detection signal. As described above, the torque sensor 13 continuously outputs the torque detection signal that reflects an actual load torque in real time. Thus, the first control circuit 32 can detect the actual load torque in real time. In this embodiment, the first control circuit 32 periodically detects the load torque in a below-described control cycle.

The controller 30 includes a power supply circuit 35. The power supply circuit 35 receives the battery power from the battery 101. The power supply circuit 35 generates power-supply power from the battery power and outputs it. The power-supply power has a control voltage Vc. The control voltage Vc has, for example, a fixed voltage value. The power-supply power is delivered to respective sections in the controller 30, including the first control circuit 32. The first control circuit 32 operates by the power-supply power. In this embodiment, the power-supply power is also delivered to the rotation signal output circuit 25. The rotation signal output circuit 25 receives the power-supply power and generates the first through third position signals Hu, Hv, Hw.

The electric power tool 1 further includes a second control circuit 40. The second control circuit 40 is connected to an input I/F 17 and an indicator 16. The Input I/F 17 includes one or more switches operated by a user. The input I/F 17 of this embodiment includes, for example, four switches. The indicator 16 can display various images and/or texts.

The second control circuit 40 determines a drive setting and transmits the drive setting to the first control circuit 32. The drive setting is used to drive the motor 11. The drive setting includes various setting items. For example, various setting items include the desired rotational speed of the motor 11 and a fastening completion requirement. In this embodiment a constant rotation control is performed as described below. In the constant rotation control, the motor 11 is controlled so that the rotational speed (specifically, the actual rotational speed or the recognized rotational speed) of the motor 11 corresponds to the desired rotational speed.

The fastening completion requirement is required to stop the rotating motor 11. More specifically, the fastening completion requirement is required to start a brake process. The brake process is a process to stop the rotation of the motor 11. In response to the brake process being performed by the first control circuit 32, the rotation of the motor 11 is stopped.

In this embodiment, in response to the trigger switch 8 being turned on, the motor 11 starts to rotate. In response to the stop requirement being satisfied during the rotation of the motor 11, the brake process is started. The stop requirement is satisfied, for example, in response to the trigger switch 8 being turned off, or the above-mentioned fastening completion requirement being satisfied in this embodiment. Thus, in response to the fastening completion requirement being satisfied during the rotation of the motor 11, the stop requirement is satisfied even if the trigger switch 8 is turned on. In response to the stop requirement being satisfied, the brake process is started, and the motor 11 is thereby stopped.

The fastening completion requirement may be determine in any manner.

In this embodiment, the fastening completion requirement includes, for example, desired torque (or target torque), drive time and/or a fastening rotation angle. If the fastening completion requirement includes, for example, the desired torque, the fastening completion requirement is satisfied in response to the load torque reaching the desired torque after the motor 11 starts rotating. If the fastening completion requirement includes, for example, the drive time, the fastening completion requirement is satisfied when the drive time passes after the motor 11 starts rotating. If the fastening completion requirement includes, for example, the desired torque and the drive time, the fastening completion requirement is satisfied when the load torque reaches the desired torque, or, the drive time passes after the motor 11 starts rotating.

The user can individually or collectively select the setting items through the input I/F 17. In response to the setting items selected by the user being determined as the drive setting, the second control circuit 40 notifies the first control circuit 32 of the determined drive setting. Specifically, the second control circuit 40 outputs data indicating the drive setting to the first control circuit 32.

For example, the user may be able to select a desired rotational speed from first through Nth desired rotational speeds. “N” is a natural number of equal to or more than two. Each of the first through Nth desired rotational speeds may be, for example, within a range from 20000 rpm to 1000 rpm inclusive. One or more of the first through Nth desired rotational speeds may be equal to or less than a preset threshold. The preset threshold may be, for example, 5000 rpm.

The second control circuit 40 of this embodiment displays, for example, N types of options of the drive setting in the indicator 16. The N types of options respectively include the above-described first through Nth desired rotational speeds. The user can select one of the options through the input I/F 17. In response to an option being selected by the user, the second control circuit 40 determines the selected option as a drive setting and notifies the first control circuit 32 of the drive setting. In this embodiment, one specific option is set as a default option. Upon activation, the second control circuit 40 executes an initial process. The initial process includes determining the default option as the drive setting, and notifying the first control circuit 32 thereof.

(2-3) Constant Rotation Control

In response to the trigger switch 8 being turned on, the first control circuit 32 executes the constant rotation control to thereby rotate the motor 11 in a rotation direction set by the direction setting switch 9.

Specifically, the first control circuit 32 obtains the above-described drive setting from the second control circuit 40. The drive setting includes the desired rotational speed. The first control circuit 32 controls the battery power (specifically, the three-phase power) to the motor 11 so that the rotational speed of the motor 11 corresponds to the desired rotational speed obtained.

The constant rotation control of this embodiment includes a rotational speed feedback control and a torque feedback control. Hereinafter, “feedback” is also referred to as “FB”. In the rotational speed FB control in this embodiment, a proportional-integral control is used, for example. In the torque FB control in this embodiment, a proportional control is used, for example.

In the rotational speed FB control, an initial value calculation process is performed. In the initial value calculation process, an initial value of a drive command value is calculated so that the rotational speed of the motor 11 corresponds to the desired rotational speed. The drive command value shows the magnitude of electric power to be supplied to the motor 11. The drive command value of this embodiment includes a duty ratio. Hereinafter, this duty ratio is referred to as “drive duty ratio”. In other words, the initial value calculation process is a process to calculate an initial value of the drive duty ratio. In the initial value calculation process, the initial value of the drive duty ratio is calculated in accordance with a difference between the recognized rotational speed and the desired rotational speed (hereinafter, also referred to as “speed difference”). As described above, the recognized rotational speed is calculated based on the rotational position information. For example, the initial value of the drive duty ratio may increase in accordance with the increase in the speed difference. The initial value of the drive duty ratio corresponds to the sum of a first duty ratio DU1 and a second duty ratio DU2, which will be described below.

In the torque FB control, a correction process is performed. In the correction process, the initial value of the drive duty ratio (i.e. the initial value of the drive command value) calculated in the rotational speed FB control is corrected. Specifically, the initial value of the drive duty ratio is corrected based on the load torque detected based on the torque detection signal.

One of the main purposes of the correction process is (i) to inhibit the rotational speed of the motor 11 from being decreased to a speed lower than the desired rotational speed because of the increase in the load torque, or (ii) to inhibit the motor 11 from being stopped because of the increase in the load torque.

That is, in this embodiment, as described above, the recognized rotational speed is updated each time the motor 11 rotates by a given rotation angle (in this embodiment, for example, by a rotation angle corresponding to 60 electrical degrees). On the other hand, if the load torque is increased, the actual rotational speed of the motor 11 can be decreased. Thus, even if the actual rotational speed is greatly decreased from the recognized rotational speed after the recognized rotational speed is updated at a first update timing, the first control circuit 32 assumes that the actual rotational speed of the motor 11 is maintained at the recognized rotational speed updated at the first update timing until a next second update timing arrives. In this case, the drive duty ratio is not updated until the next second update timing although the situation actually requires the drive duty ratio to be increased. That is, a drive duty ratio in accordance with the actual rotational speed is not calculated until the next update timing. This may cause insufficient output torque from the motor 11 to enlarge the difference between the actual rotational speed and the desired rotational speed, which in turn may cause the motor 11 to be stopped.

Especially during a low speed rotation, a time interval at which the recognized rotational speed is updated becomes longer. Therefore, for example, when the motor 11 receives large load torque during the low speed rotation and the motor 11 is slowed down, a situation where the actual rotational speed is lower than the recognized rotational speed occurs for an extended period of time. Furthermore, the difference between the actual rotational speed and the recognized rotational speed may also be increased. Therefore, if the load torque is increased during the low speed rotation, there is a possibility that the rotational speed of the motor 11 is rapidly decreased, or the motor 11 is locked.

Thus, in this embodiment, the torque FB control is performed in addition to the rotational speed FB control. By the torque FB control being performed, it is possible to calculate a more appropriate drive duty ratio suitable for the load torque. In the correction process, for example, an initial value of the drive duty ratio is corrected so that the initial value of the drive duty ratio is increased in accordance with the increase in the load torque. Specifically, in this embodiment, a correction value is calculated, and the correction value is added to the initial value. The correction value corresponds to a below-described third duty ratio DU3. The correction value is increased in accordance with the increase in the load torque.

The torque FB controls may be performed all the time during the execution of the constant rotation control. In this embodiment, the torque FB control is performed when the constant rotation control is executed and a correction requirement is satisfied. In response to the correction requirement not being satisfied, the torque FB control is not performed. In response to the torque FB control not being performed, the initial value calculated by the rotational speed FB control is set to the drive duty ratio. In response to the correction requirement being satisfied, the initial value corrected by the torque FB control is set to the drive duty ratio.

The correction requirement may be satisfied in any case. For example, the correction requirement may be satisfied in a case where the desired rotational speed is set to a speed equal to or lower than the preset threshold.

The first control circuit 32 repeatedly (or periodically) calculates the drive duty ratio in a specified control cycle. The control cycle is shorter than a low speed unit rotation time. The low speed unit rotation time corresponds to a period of time required for the rotor 19 rotating at a speed lower than the specified rotational speed to rotate by a specified rotation angle. That is, the control cycle is shorter than the update interval of the recognized rotational speed (i.e. the interval between the Hall sensor interruptions) when the rotor 19 rotates at a speed lower than a specified rotational speed. The specified rotational speed may be the same as and may be different from the preset threshold. The control cycle is shorter than the update interval of the recognized rotational speed when the motor 11 rotates at a maximum desired rotational speed (e.g. at a preset threshold) satisfying the correction requirement. More specifically, for example, the control cycle may be half or less than the update interval.

In the constant rotation control, the first control circuit 32 calculates a drive duty ratio in each control cycle and drives the drive circuit 31 based on the drive duty ratio. The first control circuit 32 drives the drive circuit 31 by a low-side-PWM process and/or a high-side-PWM process.

In the low-side-PWM process, any one of three high-side switches is held (or maintained) in an ON-state. In the low-side-PWM process, furthermore, any one of low-side switches in a system different from the system containing the high-side switch held in the ON-state (hereinafter, also referred to as "ON-held HSS") is PWM driven. Hereinafter, the low-side switch that is PWM driven is also referred to as "PWM-driven LSS".

The "high-side switch" corresponds to each of the first, third, and fifth switches UH, VH, WH. That is, the "three high-side switches" corresponds to the first, third, fifth switches UH, VH, WH. The "low-side switch" corresponds to each of the second, fourth, and sixth switches UL, VL, WL. That is, the "three low-side switches" corresponds to the second, fourth, and sixth switches UL, VL, WL.

The PWM drive (i.e. being PWM driven) means periodically turning on and off a switch (e.g. the PWM-driven LSS) targeted for the PWM drive in accordance with a pulse width modulated signal. The pulse width modulated signal includes the above-mentioned drive duty ratio. That is, the PWM drive is to drive a switch to be driven by a pulse width modulated signal having a drive duty ratio.

In the high-side-PWM process, any one of three low-side switches is held in the ON-state. In the high-side-PWM process, furthermore, any one of high-side switches in a system different from the system containing the low-side switch held in the ON-state (hereinafter, also referred to as "ON-held LSS") is PWM driven. The high-side switch that is PWM driven is also referred to as "PWM driven HSS".

When functionalizing the first switch UH as the ON-held HSS, the first control circuit 32 outputs the first drive signal to the first switch UH to hold the first switch UH in the ON-state. When functionalizing the first switch UH as the PWM-driven HSS, the first control circuit 32 sets the above-mentioned pulse width modulated signal to the first drive signal and outputs the first drive signal to the first switch UH. The same can be applied to a case of functionalizing each of the third and fifth switches VH, WH as the ON-held HSS or the PWM-driven HSS.

When functionalizing the second switch UL as the ON-held LSS, the first control circuit 32 outputs the second drive signal to the second switch UL to hold the second switch UL in the ON-state. When functionalizing the second switch UL as the PWM-driven LSS, the first control circuit 32 sets the above-mentioned pulse width modulated signal to the second drive signal and outputs the second drive signal to the second switch UL. The same can be applied to a case of functionalizing each of the fourth and sixth switches VL, WL as the ON-held LSS or the PWM-driven LSS.

When the first control circuit 32 is configured to perform the low-side-PWM process, the first control circuit 32 rotates the motor 11 while appropriately switching the combination of the ON-held HSS and the PWM-driven LSS depending on a rotational position (i.e. rotation angle) of the motor 11.

When the first control circuit 32 is configured to perform the high-side-PWM process, the first control circuit 32 rotates the motor 11 while appropriately switching the combination of the ON-held LSS and the PWM-driven HSS depending on the rotational position of the motor 11.

The first control circuit 32 may be configured to execute the low-side-PWM process without executing the high-side-PWM process. The first control circuit 32 may be configured to execute the high-side-PWM process without executing the low-side-PWM process. The first control circuit 32 may be configured to execute the high-side-PWM process and the low-side-PWM process. Specifically, the first control circuit 32 may rotate the motor 11 while appropriately switching the low-side-PWM process and the high-side-PWM process.

Figure 5:
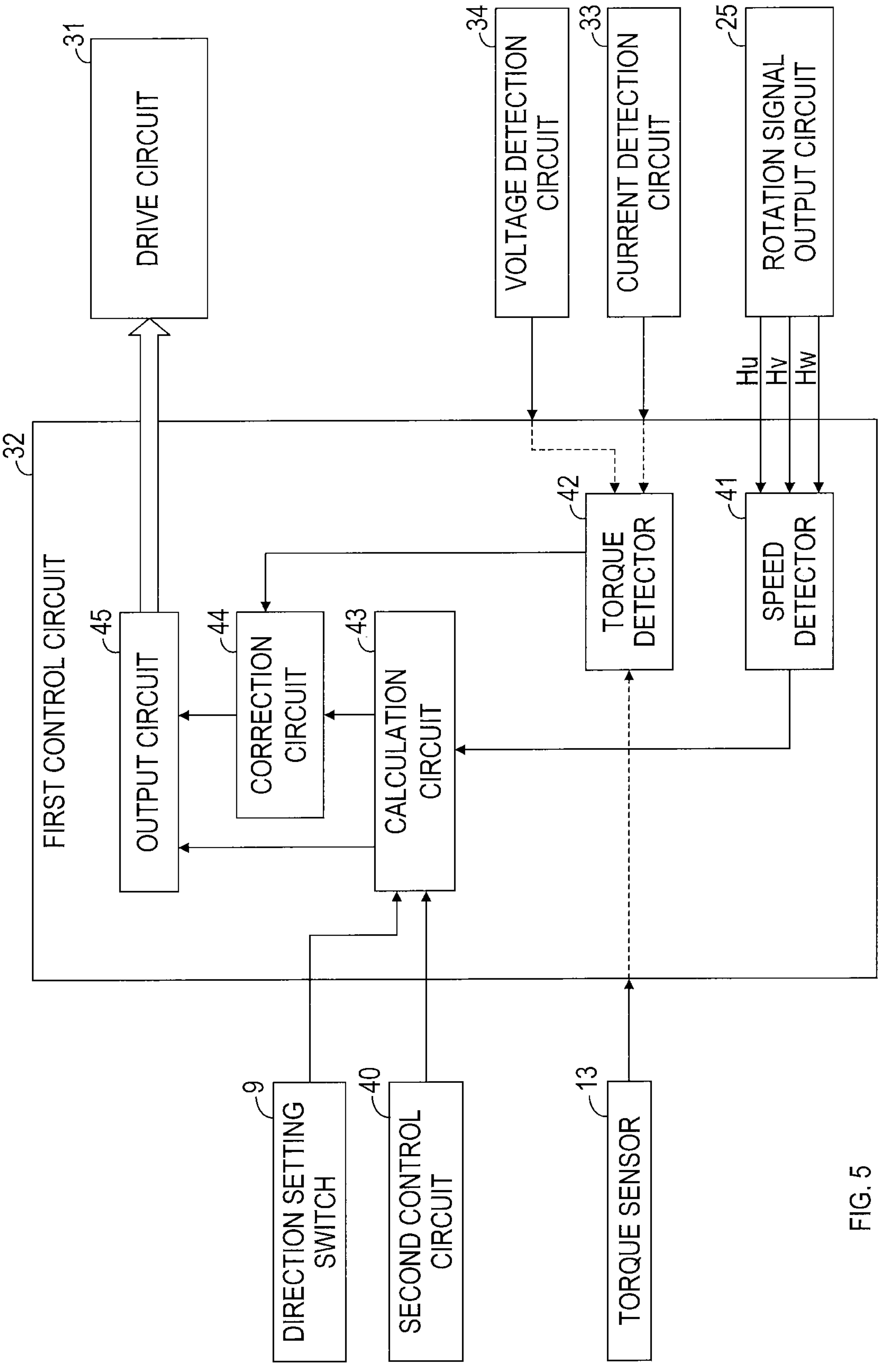
FIG. 5 is a block diagram showing functions of a first control circuit.

Supplemental explanation will be given on the aforementioned constant rotation control with reference to FIG. 5. The constant rotation control is implemented in accordance with a program, i.e. by software processing as described below. That is, the first control circuit 32 functions as shown in FIG. 5 by executing the software. Specifically, the first control circuit 32 includes a speed detector 41, a torque detector 42, a calculation circuit 43, a correction circuit 44, and an output circuit 45. The speed detector 41, the torque detector 42, the calculation circuit 43, the correction circuit 44, and the output circuit 45 correspond to functions achieved by the software for the constant rotation control. Note that one or more of the speed detector 41, torque detector 42, calculation circuit 43, correction circuit 44 and output circuit 45 may be implemented by a hard wired circuit. One or more of the speed detector 41, the torque detector 42, the calculation circuit 43, the correction circuit 44 and the output circuit 45 may be provided outside the first control circuit 32, or separately from the first control circuit 32, or independently from the first control circuit 32.

The speed detector 41 receives rotational position information from the rotation signal output circuit 25. The speed detector 41 detects a rotational speed based on the rotational position information.

The torque detector 42 receives the torque detection signal from the torque sensor 13. The torque detector 42 detects the load torque (specifically the magnitude of the load torque) based on the torque detection signal.

The calculation circuit 43 calculates an initial value of a drive command value (in this embodiment, the drive duty ratio). Specifically, the calculation circuit 43 receives a direction setting signal from the direction setting switch 9 and receives a drive setting from the second control circuit 40. The calculation circuit 43 calculates the initial value so that (i) the motor 11 rotates in a direction indicated by the direction setting signal and that (ii) the rotational speed detected by the speed detector 41 corresponds to the desired rotational speed indicated in the drive setting.

In a case where a correction requirement is satisfied, the correction circuit 44 corrects the initial value calculated by the calculation circuit 43 based on the magnitude of the load torque detected by the torque detector 42.

The output circuit 45 sets the drive duty ratio of a PWM-drive signal to the drive duty ratio that is calculated or corrected. The PWM-drive signal corresponds to one of the signals output to the PWM-driven HSS or PWM-driven LSS among the first through sixth drive signals. Specifically, in response to the correction requirement not being satisfied, the output circuit 45 sets the initial value calculated by the calculation circuit 43 to a drive duty ratio. Then, the output circuit 45 outputs the PWM-drive signal indicating the drive duty ratio. On the other hand, in response to the correction requirement being satisfied, the output circuit 45 outputs the PWM-drive signal indicating the drive duty ratio corrected by the correction circuit.

Figure 6:
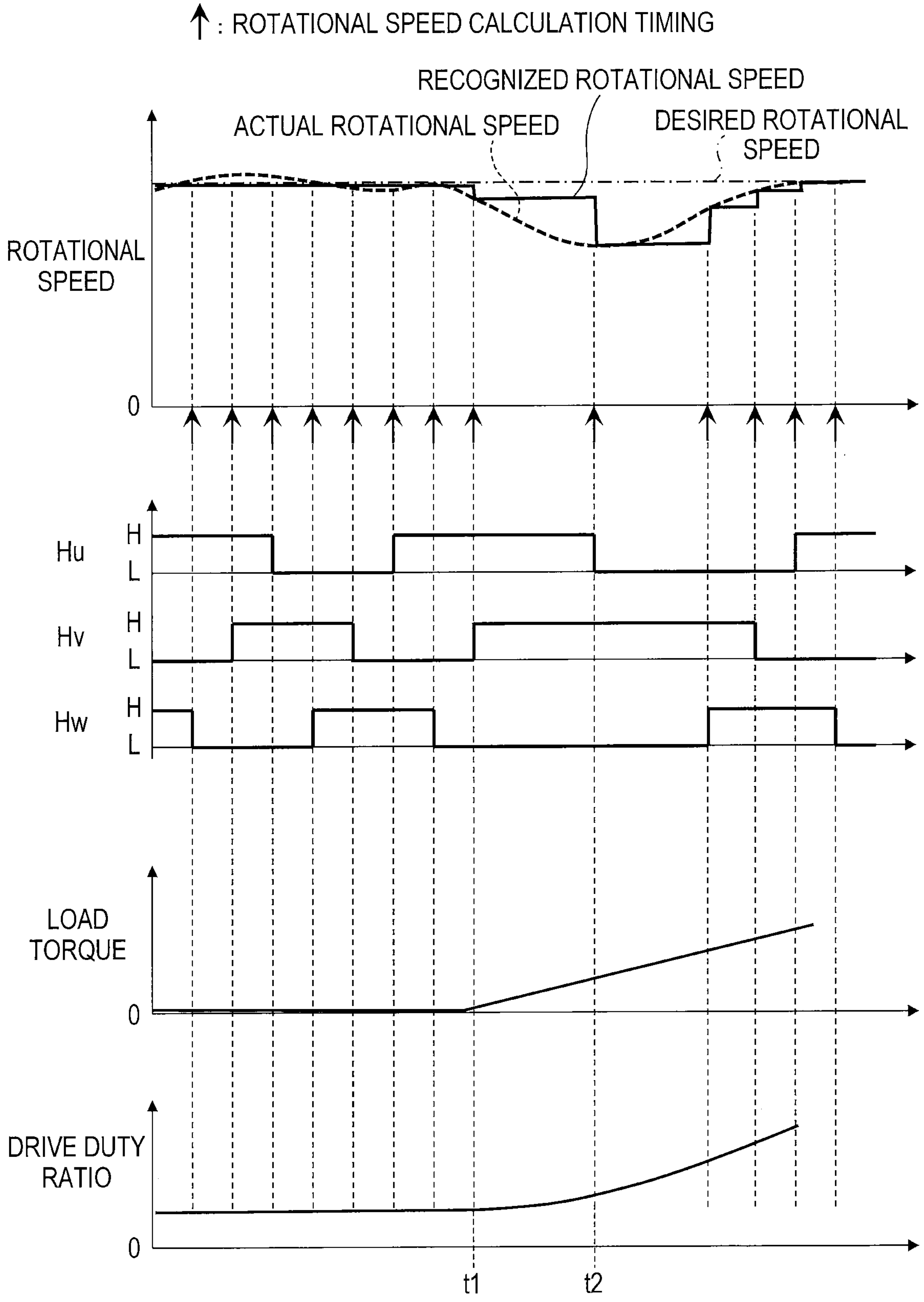
FIG. 6 is an explanatory diagram showing an execution example of a constant rotation control including a torque feedback control.

(2-4) Implementation Example of Constant Rotation Control including Torque FB Control With reference to FIG. 6, a description will be made of an operation example of the motor 11 when the constant rotation control including the torque FB control is executed. FIG. 6 is one example showing the rotational speed, the rotational position information, the load torque, and the drive duty ratio of the motor 11. In the example of FIG. 6, the rotational position information is updated (i.e. the recognized rotational speed is updated) at time t1. It is time t2 when the rotational position information is updated after time t1. In this embodiment, the description of "the rotational position information is updated" means that at least one of the first through third position signals Hu, Hv, Hw is varied. The load torque begins to increase near the time t1. Thus, immediately after the time t1, the actual rotational speed of the motor 11 decreases from the desired rotational speed. This makes the update interval of the rotational position information (i.e., the update interval of the recognized rotational speed) long. For example, a time interval from the time t1 through time t2 becomes longer. Thus, a difference between the recognized rotational speed and the actual rotational speed increases from the time t1 through the time t2.

However, in this embodiment, the torque FB control is executed and the drive duty ratio (more specifically, the initial value) is corrected in each control cycle. Even if the difference between the desired rotational speed and the recognized rotational speed does not vary, the drive duty ratio (more specifically, the correction value) is increased in accordance with the increase in the load torque. This makes it possible for the motor 11 to output the torque suitable for the increase in the load torque. As a result, although the difference between the actual rotational speed and the desired rotational speed temporarily increases after the time t1, the decrease in the actual rotational speed stopes near the time t2, for example, because of the torque FB control. Thereafter, even if the load torque continuously increases, the decrease in the actual rotational speed is inhibited by the torque FB control, and the actual rotational speed gets closer to the desired rotational speed.

Figure 7:
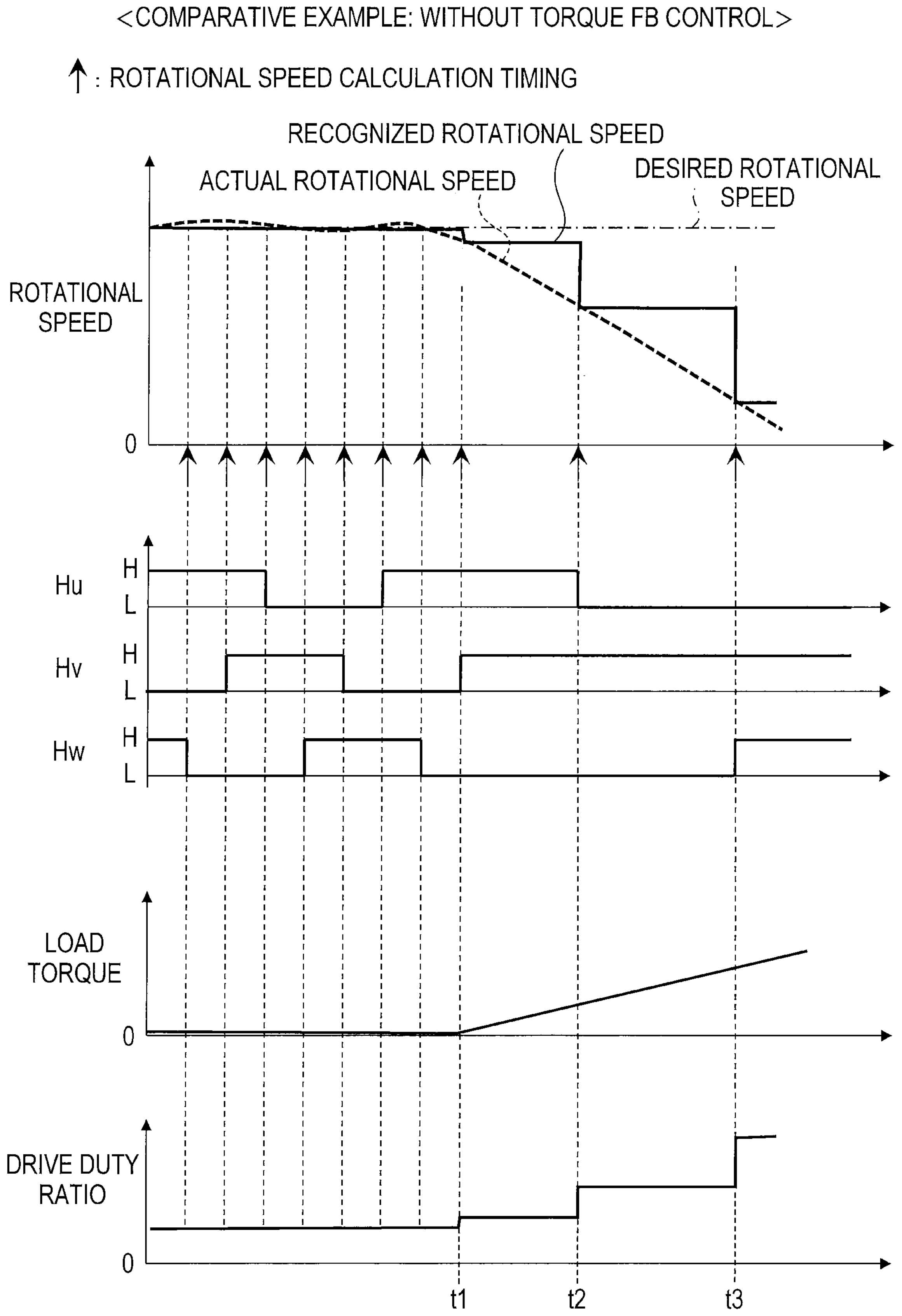
FIG. 7 is an explanatory diagram showing an execution example of a constant rotation control without the torque feedback control.

FIG. 7 shows, for the purpose of comparison with FIG. 6, an operation example of the motor 11 when the torque FB control is not performed. As in the case of FIG. 6, FIG. 7 shows one example of the rotational speed, the rotational position information, the load torque, and the drive duty ratio of the motor 11. In the example of FIG. 7, the load torque begins to increase near the time t1. However, the drive duty ratio is not updated until time t2. Thus, the increase in the drive duty ratio cannot catch up with the decrease in the actual rotational speed, whereby the motor 11 cannot output appropriate torque suitable for the load torque. Therefore, the actual rotational speed decreases in accordance with the increase in the load torque.

(2-5) Motor Control Process

Figure 8:
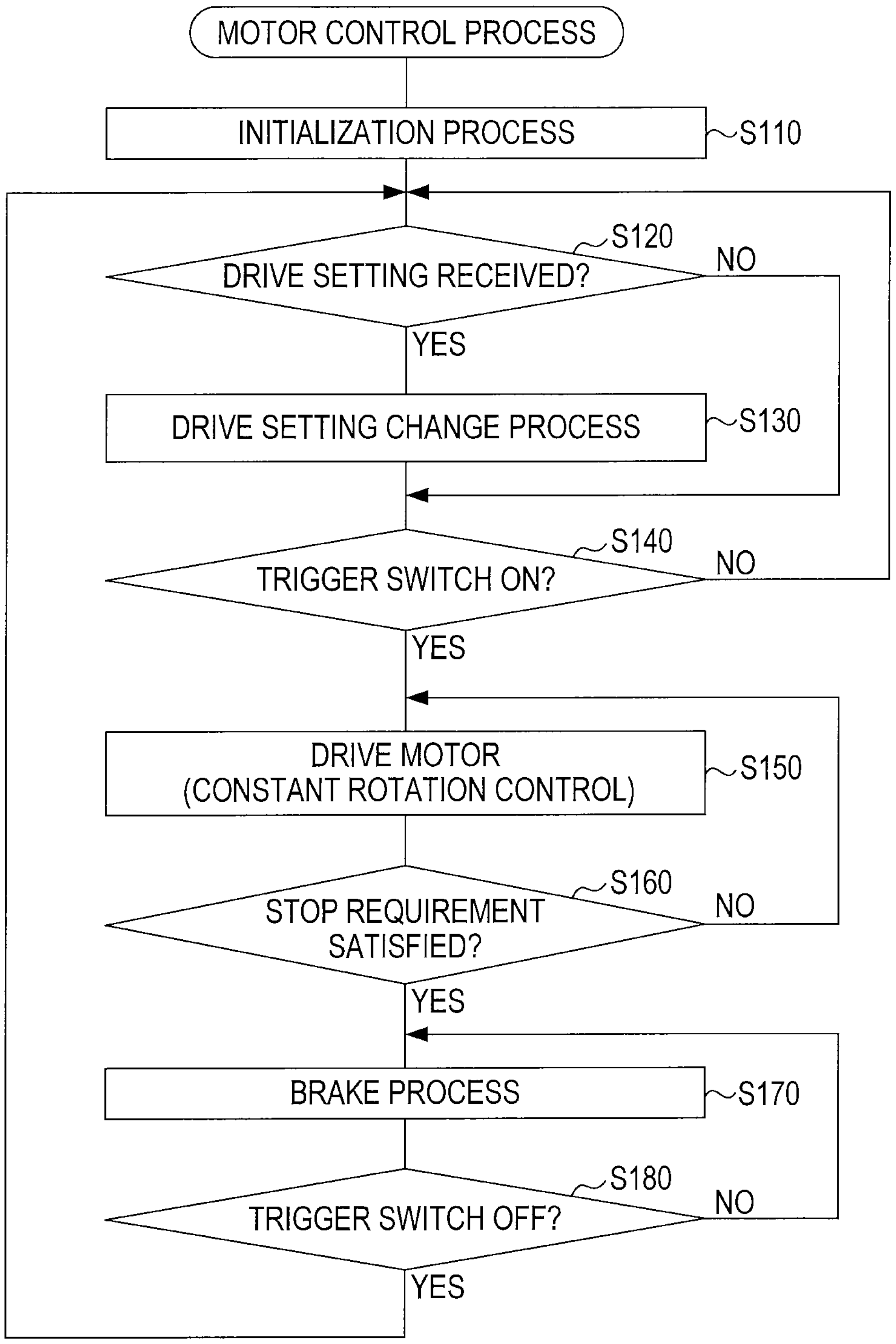
FIG. 8 is a flow chart of a motor control process.

With reference to FIG. 8, the motor control process executed by the first control circuit 32 (more specifically, executed by the CPU 32*a*) is described. The above-mentioned constant rotation control is performed in this motor control process. When activated, the first control circuit 32 executes the motor control process.

When the first control circuit 32 starts the motor control process, an initialization process is performed in S110. The initialization process includes, for example, setting each port in the CPU 32*a*. The initialization process includes, for example, obtaining a drive setting (e.g. above-mentioned default option) from the second control circuit 40. In this case, the initialization process furthermore includes setting a desired rotational speed and a fastening completion requirement included in the obtained drive setting.

In S120, the first control circuit 32 determines whether to have received the drive setting from the second control circuit 40. In response to the drive setting being changed by the user, the second control circuit 40 notifies of the changed drive setting. If the first control circuit 32 has not received the drive setting from the second control circuit 40, this process proceeds to S140. If the first control circuit 32 has received the drive setting from the second control circuit 40, this process proceeds to S130.

In S130, the first control circuit 32 executes a drive setting change process. Specifically, the first control circuit 32 updates the settings for, such as, the desired rotational speed and the fastening completion requirement in the first control circuit 32 based on the drive setting that was input in S120. This process proceeds to S140 after the process of S130 is executed.

In S140, the first control circuit 32 determines whether the trigger switch 8 is turned on. If the trigger switch 8 is not turned on, this process proceeds to S120. If the trigger switch 8 is turned on, this process proceeds to S150. In S150, the first control circuit 32 drives the motor 11. Specifically, the above-mentioned constant rotation control is started. In the constant rotation control, the first control circuit 32 periodically and repeatedly executes a duty ratio calculation process shown in FIG. 9.

In response to the constant rotation control being started (i.e. during the execution of the constant rotation control), the first control circuit 32 determines whether a stop requirement has been satisfied in S160. If the stop requirement has not been satisfied, this process proceeds to S150 and continues to execute the constant rotation control. If the stop requirement has been satisfied, this process proceeds to S170.

In S170, the first control circuit 32 ends the constant rotation control and executes a brake process. Specifically, the first control circuit 32 activates, for example, a dynamic braking. The dynamic braking includes causing any two or all of the first through third terminals 11*a*-11*c* of the motor 11 to be short-circuited through the drive circuit 31. Specifically, for example, the first control circuit 32 maintains any two or three of the low-side switches in the ON-state while all the high-side switches are held in an OFF-state. This activates the dynamic braking.

In response to the motor 11 being stopped by the brake process, this process proceeds to S180. In S180, the first control circuit 32 determines whether the trigger switch 8 is turned off. If the trigger switch 8 is turned on, the first control circuit 32 continues to execute the brake process in S170. If the trigger switch 8 is turned off, this process proceeds to S120.

(2-6) Duty Ratio Calculation Process

Figure 9:
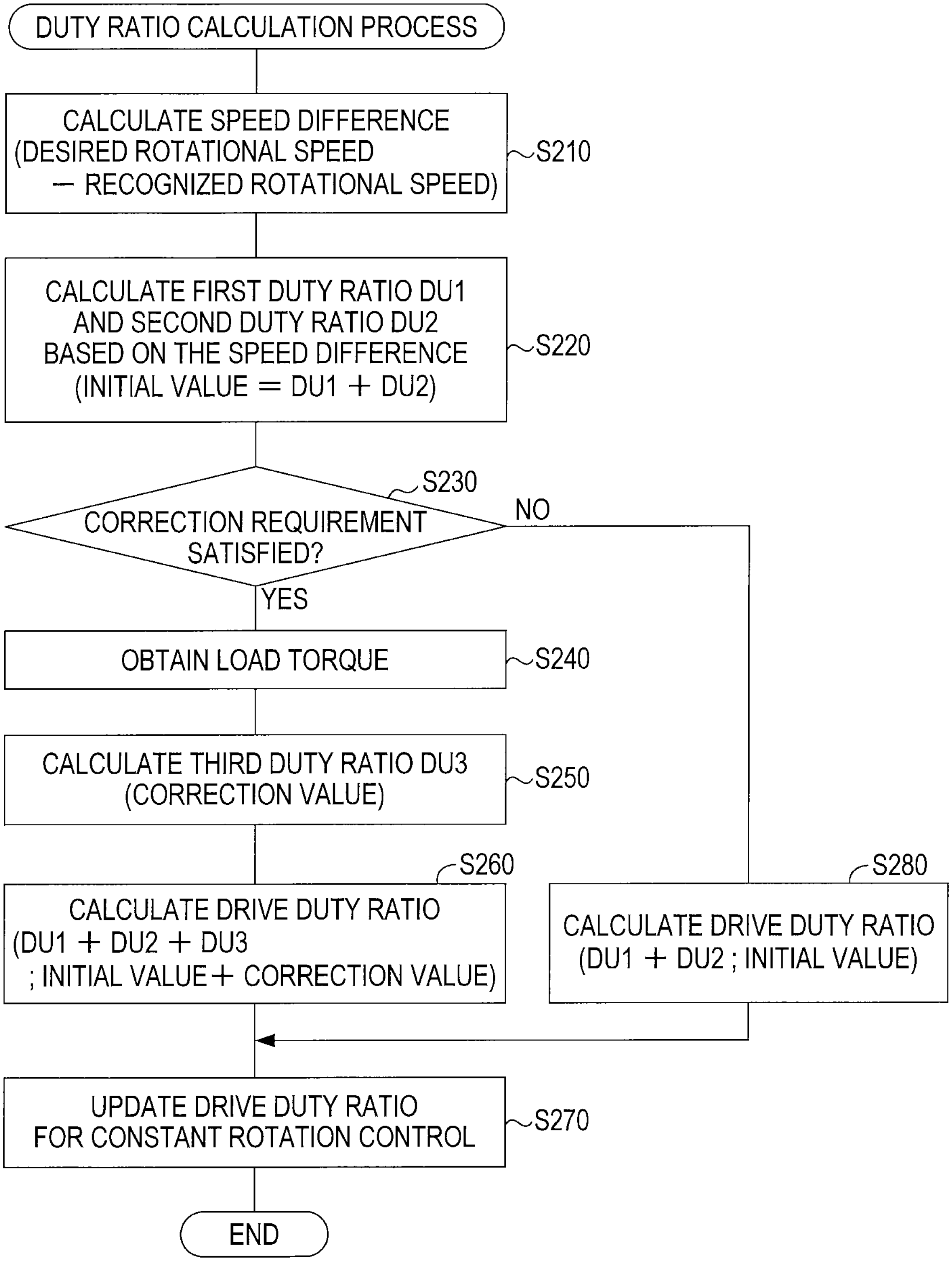
FIG. 9 is a flow chart of a duty ratio calculation process.

With reference to FIG. 9, the duty ratio calculation process executed by the first control circuit 32 (more specifically, executed by the CPU 32*a*) is described. While driving the motor 11 in S150 of FIG. 8 (i.e. while the constant rotation control is executed), the first control circuit 32 executes the duty ratio calculation process concurrently with the constant rotation control (e.g. in multitasking). The first control circuit 32 periodically and repeatedly executes the duty ratio calculation process in the above-mentioned control cycle.

In response to the first control circuit 32 starting the duty ratio calculation process, in S210, a speed difference is calculated. The speed difference is calculated, for example, by subtracting the recognized rotational speed from the desired rotational speed.

In S220, the first control circuit 32 calculates a first duty ratio DU1 and a second duty ratio DU2 based on the speed difference calculated in S210. The first duty ratio DU1 is a duty ratio calculated by a proportional control calculation based on the speed difference. The first duty ratio DU1 includes a component proportional to the speed difference. The second duty ratio DU2 is a duty ratio calculated by an integral control calculation based on the speed difference. The second duty ratio DU2 includes a component in accordance with an integral value of the speed difference. That is, the process of S220 corresponds to the rotational speed FB control using a so-called proportional-integral control.

It may be said that the process of S220 is a process to calculate an initial value of the drive duty ratio, namely a drive duty ratio that is not corrected. More specifically, the sum of the first duty ratio DU1 and the second duty ratio DU2 corresponds to the initial value of the drive duty ratio. The calculation of the initial value, namely, the above-mentioned addition may be performed in S220, or may be performed in below-described S260 or S280.

In S230, the first control circuit 32 determines whether a correction requirement is satisfied. If the correction requirement is not satisfied, this process proceeds to S280. In S280, the first control circuit 32 calculates the drive duty ratio. Specifically, the first control circuit 32 calculates the sum of the first duty ratio DU1 and the second duty ratio DU2 calculated in S220 (i.e. the initial value of the drive duty ratio). If this initial value has been already calculated before S280 (e.g. S220), the calculated initial value is obtained in S280, for example. In S270, the first control circuit 32 updates a drive duty ratio to be use for the control of the motor 11 to the drive duty ratio (the initial value in this case) calculated in S280.

If the correction requirement is satisfied in S230, this process proceeds to S240.

In S240, the first control circuit 32 obtains a current load torque (i.e. the magnitude of the current load torque). The first control circuit 32 may calculate the load torque based on, for example, a torque detection signal currently input from the torque sensor 13. The first control circuit 32 may obtain the calculated load torque as current load torque.

In S250, the first control circuit 32 calculates a third duty ratio DU3 based on the load torque obtained in S240. The third duty ratio DU3 is a duty ratio calculated by a proportional control calculation based on the load torque. The third duty ratio DU3 includes a component proportional to the load torque. That is, the process of S250 corresponds to the torque FB control using the so-called proportional control.

In S260, the first control circuit 32 calculates a drive duty ratio.

Specifically, the first control circuit 32 calculates the sum of the first duty ratio DU1 calculated in S220, the second duty ratio DU2 calculated in S220, and the third duty ratio DU3 calculated in S250. That is, in S260, the initial value of the drive duty ratio is corrected by the third duty ratio DU3. In the process of S260, the process of adding the first duty ratio DU1 and the second duty ratio DU2 corresponds to the above-mentioned initial value calculation process. In S260, the process of further adding the third duty ratio DU3 corresponds to the above-mentioned correction process.

In S270, the drive duty ratio to be used in the constant rotation control is updated to the drive duty ratio calculated in S260.

(2-7) Correspondence Between Terms

In the above-described embodiment, the chuck sleeve 10 corresponds to one example of the output shaft in the overview of the embodiment. The driving mechanism 12 corresponds to one example of the gear box in the overview of the embodiment. The first control circuit 32 corresponds to one example of the control circuit in the overview of the embodiment. Each of the first through sixth switches UH-WL corresponds to one example of the switch in the overview of the embodiment. The PWM drive corresponds to one example of the driving process in the overview of the embodiment. The control cycle corresponds to one example of the preset cycle in the overview of the embodiment.

The process of S260 corresponds to one example of the initial value calculation process and the correction process in the overview of the embodiment. In response to the addition of the third duty ratio DU3 not being carried out in S260, the process of S260 corresponds to one example of the initial value calculation process in the overview of the embodiment.

3. Other Embodiments

The embodiment of the present disclosure has been described; however, the present disclosure may be embodied in various forms without limited to the above-described embodiments.

(3-1) The first control circuit 32 may obtain the load torque in any manner. The first control circuit 32 may detect the load torque based on, for example, a current detection signal input from the current detection circuit 33 (that is, based on a motor current value). Specifically, as exemplified in FIG. 5, the torque detector 42 may receive the current detection signal from the current detection circuit 33. Then the torque detector 42 may detect the load torque based on the current detection signal. The motor current value is generally varied depending on the magnitude of the load torque. That is, the motor current value increases as the load torque increases. Thus, it is possible to calculate (or estimate) the load torque based on the motor current value. The first control circuit 32 may obtain the load torque based on the current detection signal in the process of S240 of FIG. 9. In this case, the torque sensor 13 may be omitted from the electric power tool 1.

Alternatively, the first control circuit 32 may detect the load torque based on a voltage detection signal received from the voltage detection circuit 34 (i.e. based on a voltage value at the voltage detection point Pv). Specifically, as exemplified in FIG. 5, the torque detector 42 may receive the voltage detection signal from the voltage detection circuit 34. Then the torque detector 42 may detect the load torque based on the voltage detection signal. The voltage value at the voltage detection point Pv can be varied depending on the load torque. That is, the power supply path 50 includes resistive components. A path from the positive electrode of the battery 101 through the voltage detection point Pv also includes a resistive component. Thus, precisely speaking, when the electric current flows from the battery 101 to the motor 11, the voltage of the voltage detection point Pv becomes lower than the voltage of the positive electrode of the battery 101. A potential difference between the positive electrode of the battery 101 and the voltage detection point Pv (i.e. amount of voltage drop from the positive electrode of the battery 101 through the voltage detection point Pv) increases as the electric current to be supplied to the motor 11 increases. Thus, it is possible to calculate (or estimate) the load torque based on the voltage value at the voltage detection point Pv. Specifically, for example, a voltage value at the voltage detection point Pv when the electric current does not flow from the battery 101 to the motor 11 is set as a reference voltage value. Then, actual load torque can be calculated (or estimated) based on the difference between the reference voltage value and the actual voltage value at the voltage detection point Pv. The first control circuit 32 may obtain the load torque based on the voltage detection signal in the process of S240 of FIG. 9. The torque sensor 13 may be omitted from the electric power tool 1 also in this case.

(3-2) The torque sensor 13 may generate a torque detection signal based on any principle. The torque detection signal may be in any form. The torque detection signal may be in the form of an analog signal and may be in the form of a digital signal. The torque detection signal may be output, for example, not continuously, but discretely (e.g. periodically). However, this case, an output cycle of the torque detection signal is shorter than an update cycle of the rotational position information.

(3-3) In the constant rotation control, the rotational speed FB control may be carried out by a control method different from the proportional-integral control. The torque FB control may be also be carried out in a control method different from the proportional control.

(3-4) The rotation signal output circuit 25 may be configured in any manner and may output rotational position information of any form. For example, the rotation signal output circuit 25 may include a sensor different from the Hall sensor. The rotation signal output circuit 25 may include, for example, a rotary encoder. The rotational position information may be varied in any manner depending on the rotational position of the rotor 19. The rotational position information may include any signal. The rotational position information may include one or more digital signals and may include one or more analog signals.

(3-5) The first control circuit 32 may detect the rotational speed of the motor 11 without the use of the rotation signal output circuit 25. For example, each voltage (specifically, an induced voltage) of the first through third terminals 11$a$-11$c$ of the motor 11 may be detected. Then, the rotational position of the motor 11 may be detected based on the detected induced voltage. Thereafter, the rotational speed may be calculated based on the variation of the rotational position detected in this way. Specifically, in FIG. 5, the speed detector 41 may receive each voltage of the first through third terminals 11$a$-11$c$. Then, the speed detector 41 may calculate the rotational speed based on these voltages.

(3-6) The present disclosure may be applied to various electric power tools used in various job sites (or work sites), such as do-it-yourself carpentry, production, gardening, and construction. The present disclosure is not limited to an application to an electric power tool having a battery as a power supply. The present disclosure may be applied to an electric power tool configured to be driven with, for example, AC power. More specifically, the present disclosure may be applied to various electric power tools, such as an electric drill, an electric driver, an electric driver drill, an electric wrench, an electric grinder, an electric circular saw, an electric reciprocating saw, an electric jig saw, an electric cutter, an electric chain saw, an electric plane, an electric nailing machine (including a tacker), an electric hammer, and an electric hammer drill.

(3-7) A plurality of functions of one element of the aforementioned embodiments may be performed by a plurality of elements, and one function of one element may be performed by a plurality of elements. Furthermore, a plurality of functions of a plurality of elements may be performed by one element, and one function performed by a plurality of elements may be performed by one element. A part of the configurations of the aforementioned embodiments may be omitted. Furthermore, at least part of the configurations of the aforementioned embodiments may be added to or replaced with the configurations of the other above-described embodiments.

What is claimed is:

1. An electric power tool comprising:
- a motor;
- an output shaft configured (i) to be attached to a tip tool and (ii) to be driven with a rotational force of the motor;
- a torque detector configured to detect a magnitude of a load torque, the load torque being applied to the motor;
- a correction circuit configured to correct a drive command value based on the magnitude of the load torque detected, the drive command value indicating a magnitude of an electric power to be supplied to the motor, and
- an output circuit configured to output a drive signal, the drive signal indicating the drive command value; and
- a drive circuit configured (i) to receive the drive signal from the output circuit, and (ii) to supply, to the motor, the electric power in accordance with the drive signal to thereby drive the motor, the electric power having the magnitude corresponding to the drive command value indicated by the drive signal.

2. The electric power tool according to claim 1, further comprising:
- a calculation circuit configured to calculate an initial value of the drive command value, and
- wherein the correction circuit is configured to correct the initial value based on the magnitude of the load torque detected.

3. The electric power tool according to claim 2, further comprising:
- a speed detector configured to detect a rotational speed of the motor,
- wherein the calculation circuit is configured to calculate the initial value so that the rotational speed detected corresponds to a desired rotational speed.

4. The electric power tool according to claim 3,
- wherein the correction circuit is configured to correct the drive command value based on the desired rotational speed being equal to or less than a preset threshold.

5. The electric power tool according to claim 3,
- wherein the motor includes a rotor,
- wherein the electric power tool further includes a rotation signal output circuit configured to output a rotation signal, the rotation signal being varied each time the rotor rotates by a given angle, and
- wherein the speed detector is configured (i) to receive the rotation signal and (ii) to detect the rotational speed based on the rotation signal.

6. The electric power tool according to claim 5,
- wherein the correction circuit is configured to repeatedly correct the drive command value in a preset cycle, and
- wherein the preset cycle is shorter than a period of time required for the rotor to rotate by the given angle at a specified rotational speed or less.

7. The electric power tool according to claim 5,
- wherein the rotation signal output circuit includes a Hall sensor.

8. The electric power tool according to claim 3,
- wherein the motor includes a rotor,
- wherein, the correction circuit is configured to repeatedly correct the drive command value in a preset cycle while the desired rotational speed is equal to or less than a preset threshold
- wherein the electric power tool further includes a rotation signal output circuit configured to output a rotation signal, the rotation signal being varied each time the rotor rotates by a given angle,
- wherein the speed detector is configured (i) to receive the rotation signal and (ii) to detect the rotational speed based on the rotation signal, and
- wherein the preset cycle is shorter than a period of time required for the rotor to rotate by the given angle at the preset threshold or less.

9. The electric power tool according to claim 2,
- wherein the output circuit is configured to output the drive signal, the drive signal indicating the drive command value corresponding to the initial value corrected.

10. The electric power tool according to claim 2,
- wherein the correction circuit is configured to add a correction value to the initial value to thereby correct the initial value, and
- wherein the correction value increases in accordance with an increase in the load torque detected.

11. The electric power tool according to claim 10,
- wherein the drive circuit includes a switch on a power supply path, the power supply path being configured to connect the motor to a power supply,
- wherein the initial value includes a first duty ratio,
- wherein the correction value includes a second duty ratio, the second duty ratio being increased in accordance with an increase in the load torque,
- wherein the correction circuit is configured to add the second duty ratio to the first duty ratio to thereby correct the first duty ratio, wherein the output circuit is configured to output the drive signal, the drive signal being in the form of a pulse width modulated signal having the first duty ratio corrected, and wherein the drive circuit is configured to periodically turn on and off the switch in accordance with the drive signal to thereby periodically complete and interrupt the power supply path.

12. The electric power tool according to claim 1, wherein the drive circuit includes a switch on a power supply path, the power supply path being configured to connect the motor to a power supply, wherein the drive command value includes a duty ratio, wherein the correction circuit is configured to correct the duty ratio based on the magnitude of the load torque detected, wherein the output circuit is configured to output the drive signal, the drive signal being in the form of a pulse width modulated signal having the duty ratio, and wherein the drive circuit is configured to periodically turn on and off the switch in accordance with the drive signal, to thereby periodically complete and interrupt the power supply path.

13. The electric power tool according to claim 1, wherein the correction circuit is configured to correct the drive command value based on the drive command value being required to be corrected, and wherein the output circuit is configured to output the drive signal based on the drive command value not being required to be corrected, the drive signal indicating the drive command value not corrected.

14. The electric power tool according to claim 1, further comprising:

a gear box configured to transmit the rotational force of the motor to the output shaft; and a torque sensor in the gear box or the output shaft, the torque sensor being configured to output a torque signal, and the torque signal indicating the magnitude of the load torque, wherein the torque detector is configured (i) to receive the torque signal and (ii) to detect the magnitude of the load torque based on the torque signal.

15. The electric power tool according to claim 1, further comprising:

a current detection circuit configured to detect a magnitude of a current flowing through the motor, wherein the torque detector is configured to detect the magnitude of the load torque based on the magnitude of the current detected.

16. The electric power tool according to claim 1, further comprising:

a power supply path configured to electrically connect the drive circuit to a power supply, the power supply being configured to supply the electric power to the motor through the power supply path and the drive circuit, and a voltage detection circuit configured to detect a magnitude of a voltage at the power supply path, wherein the torque detector is configured to detect the magnitude of the load torque based on a difference between a first voltage and a second voltage, wherein the first voltage corresponds to the voltage at the power supply path detected while the electric power is not supplied to the motor, and wherein the second voltage corresponds to the voltage at the power supply path detected while the electric power is supplied to the motor.

17. A method for controlling a motor in an electric power tool, the method comprising:

detecting a magnitude of a load torque of the motor;

correcting a drive command value based on the magnitude of the load torque detected, the drive command value indicating a magnitude of an electric power to be supplied to the motor; and supplying, to the motor, the electric power having the magnitude in accordance with the drive command value.

* * * * *